United States Patent
Hasegawa et al.

(10) Patent No.: US 11,492,802 B2
(45) Date of Patent: Nov. 8, 2022

(54) PARTITION WALL STRUCTURE AND METHOD FOR CONSTRUCTING SAME

(71) Applicant: YOSHINO GYPSUM CO., LTD., Tokyo (JP)

(72) Inventors: Tomoya Hasegawa, Tokyo (JP); Hiroyuki Sugaya, Tokyo (JP); Yukiteru Hayashi, Tokyo (JP); Naoki Imaizumi, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 16/977,183

(22) PCT Filed: Feb. 27, 2019

(86) PCT No.: PCT/JP2019/007545
§ 371 (c)(1),
(2) Date: Sep. 1, 2020

(87) PCT Pub. No.: WO2019/172040
PCT Pub. Date: Sep. 12, 2019

(65) Prior Publication Data
US 2021/0040735 A1    Feb. 11, 2021

(30) Foreign Application Priority Data
Mar. 4, 2018   (JP) .............................. JP2018-038125

(51) Int. Cl.
*E04B 2/74* (2006.01)
*E04B 1/86* (2006.01)
*E04B 2/76* (2006.01)

(52) U.S. Cl.
CPC .............. *E04B 2/7409* (2013.01); *E04B 1/86* (2013.01); *E04B 2/7457* (2013.01); *E04B 2/76* (2013.01)

(58) Field of Classification Search
CPC ........ E04B 2/7409; E04B 1/86; E04B 2/7457; E04B 2/76; E04B 2/7412; E04B 2001/8263
See application file for complete search history.

(56) References Cited

U.S. PATENT DOCUMENTS 1,654,030 A * 12/1927 Ashenhurst ........... E04B 2/7409
                                                52/342
2,132,032 A * 10/1938 Jacobsen ............... E04B 2/7409
                                                181/290

(Continued)

FOREIGN PATENT DOCUMENTS

DE    102008051696 A1 * 4/2010 ........... E04B 2/7457
FR        2622617 A1 *  5/1989 ............ E04C 2/386

(Continued)

OTHER PUBLICATIONS

Guertin, Mike, Building Soundproof Walls, https://www.finehomebuilding.com/project-guides/drywall/building-soundproof-walls, Apr./May 2017 (Year: 2017).*

(Continued)

*Primary Examiner* — Theodore V Adamos
(74) *Attorney, Agent, or Firm* — Staas & Halsey LLP

(57) ABSTRACT

A partition wall has a structure with a wall end portion butted against another building structure and exposed to architectural spaces. An end post at the end portion of the wall is constituted from first and second end post elements, which are spaced apart from each other, so that a gap or an isolation zone interrupting a propagation of a solid vibration or insulating a path for propagating the solid vibration is formed between the first and second elements. An interior finishing panel for defining the architectural space on one side of the wall is fixed to the first element and the interior (Continued)

finishing panel for defining the architectural space on an opposite side of the wall is fixed to the second element.

5 Claims, 21 Drawing Sheets

(56)  References Cited

U.S. PATENT DOCUMENTS

| | | | | |
|---|---|---|---|---|
| 2,341,305 A * | 2/1944 | Woodworth | ............ | E04B 2/845 52/317 |
| 3,611,653 A * | 10/1971 | Zinn | ..................... | E04B 2/7412 52/241 |
| 5,297,369 A * | 3/1994 | Dickinson | ............. | E04B 2/7411 52/145 |
| 6,125,608 A * | 10/2000 | Charlson | ............... | E04B 1/7604 52/404.1 |
| 2012/0066993 A1* | 3/2012 | Mommer | .............. | E04B 2/7412 52/309.4 |
| 2013/0025966 A1* | 1/2013 | Nam | ..................... | E04B 2/7409 181/290 |
| 2013/0078422 A1* | 3/2013 | Tinianov | ................. | B32B 5/022 428/138 |
| 2015/0361659 A1* | 12/2015 | Sessler | ................. | E04B 1/8209 52/483.1 |

FOREIGN PATENT DOCUMENTS

| | | | |
|---|---|---|---|
| JP | 2005-133414 A | 5/2005 | |
| JP | 2010-242298 A | 10/2010 | |
| JP | 4971876 B | 7/2012 | |
| JP | 5296600 B | 9/2013 | |
| JP | 5663119 B | 2/2015 | |

OTHER PUBLICATIONS

Dbracer, Post #3 of Post "Issue with studs and exterior walls," https://forums.redflagdeals.com/issue-studs-exterior-walls-226-7987/, Feb. 28, 2019 (Year: 2019).*

Satoshi Sugie et al.: "Effect of gypsum board laminating method on the sound insulation performance of double wall—About bonding method of laminated board"; Kobayasi Institute of Physical Research, Sep. 18, 2015, pp. 885-886.

JASS (Japanese Architectural Standard Specification) 26, "Interior Finishing Work", published by the Architectural Institute of Japan; 5 pages.

International Search Report dated Apr. 23, 2019 from International Application No. PCT/JP2019/007545, 4 pages.

Sugie, Satoshi et al., "Effect of gypsum board laminating method on the sound insulation performance of double-wall," Kobayashi Institute of Physical Research, Sep. 18, 2015, pp. 1-4.

JASS (Japanese Architectural Standard Specification) 26, "Interior Finishing Work", published by the Architectural Institute of Japan; pp. 1-4.

Written Opinion for International Application No. PCT/JP2019/007545, dated Apr. 23, 2019.

* cited by examiner

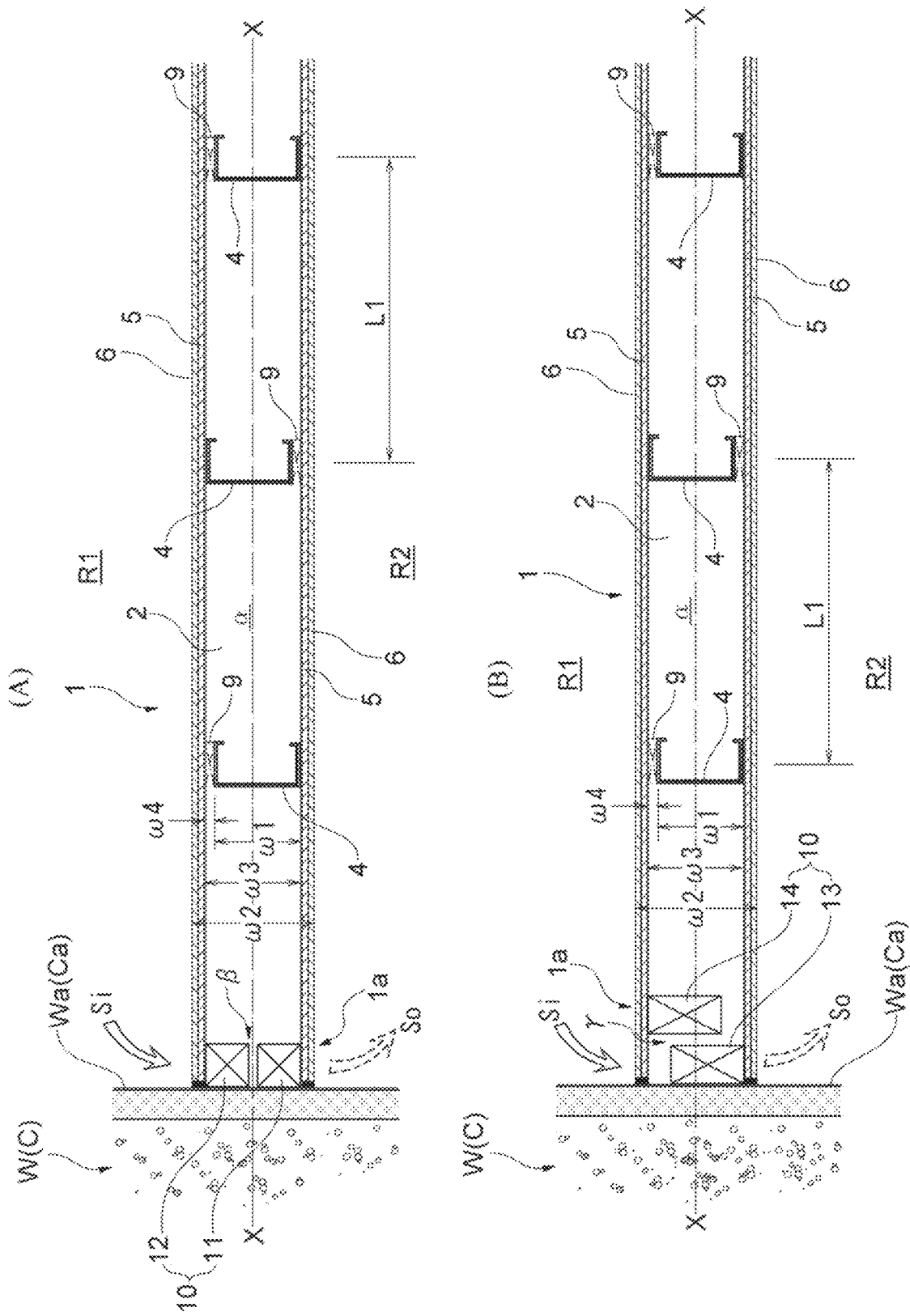

[Fig. 2]
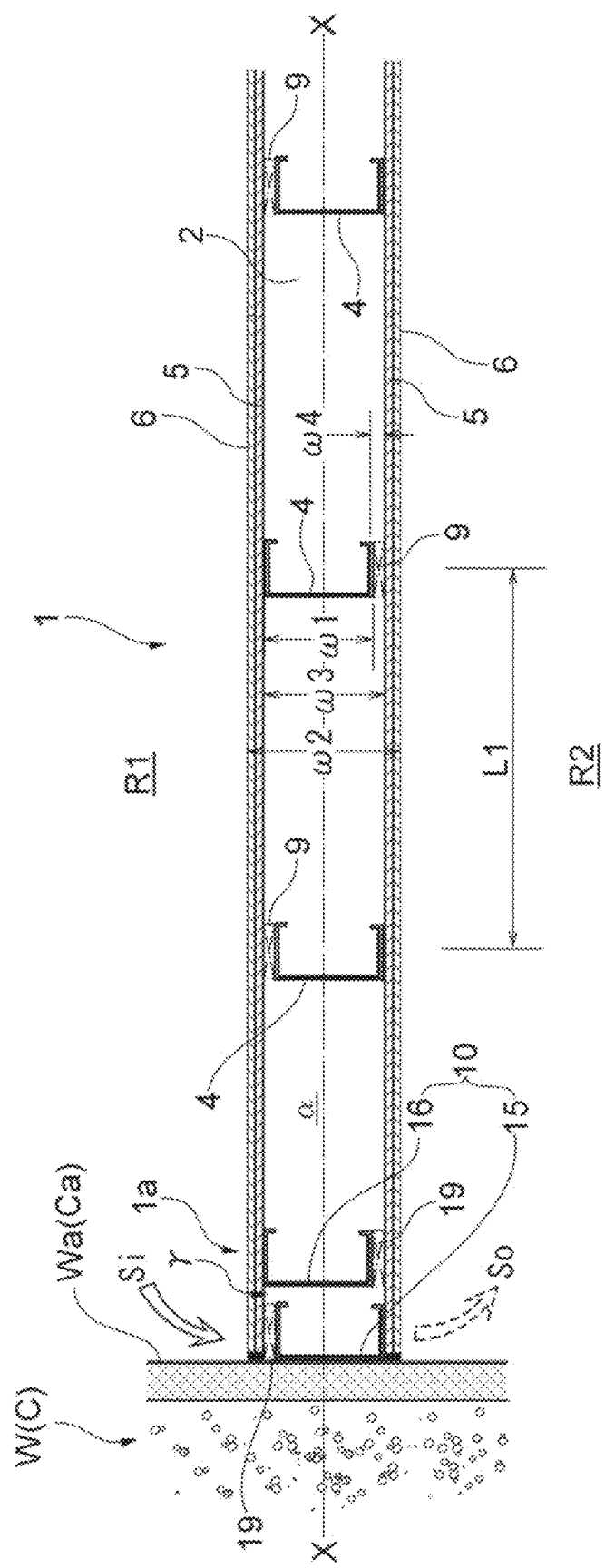

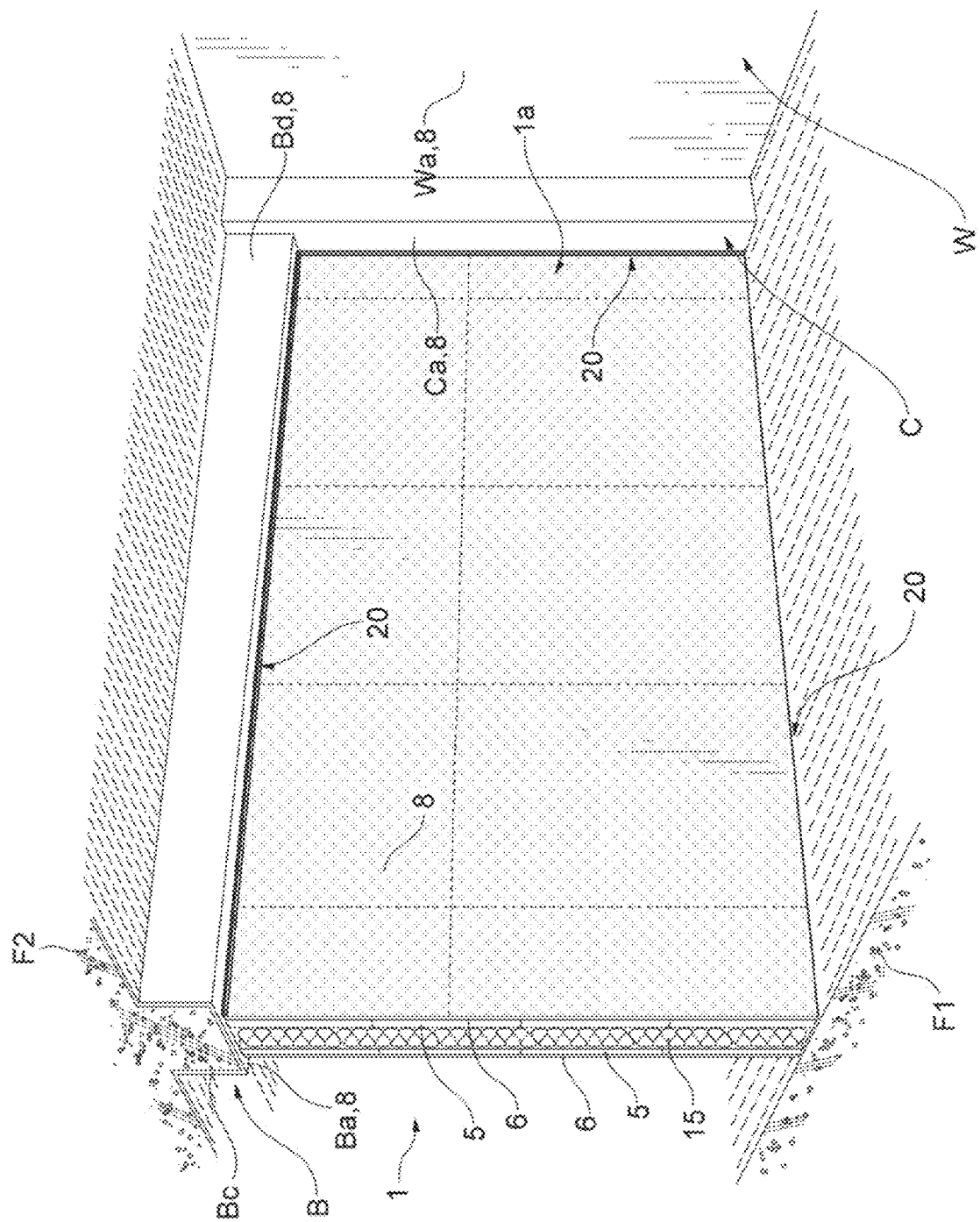
[Fig. 3]

[Fig. 4]
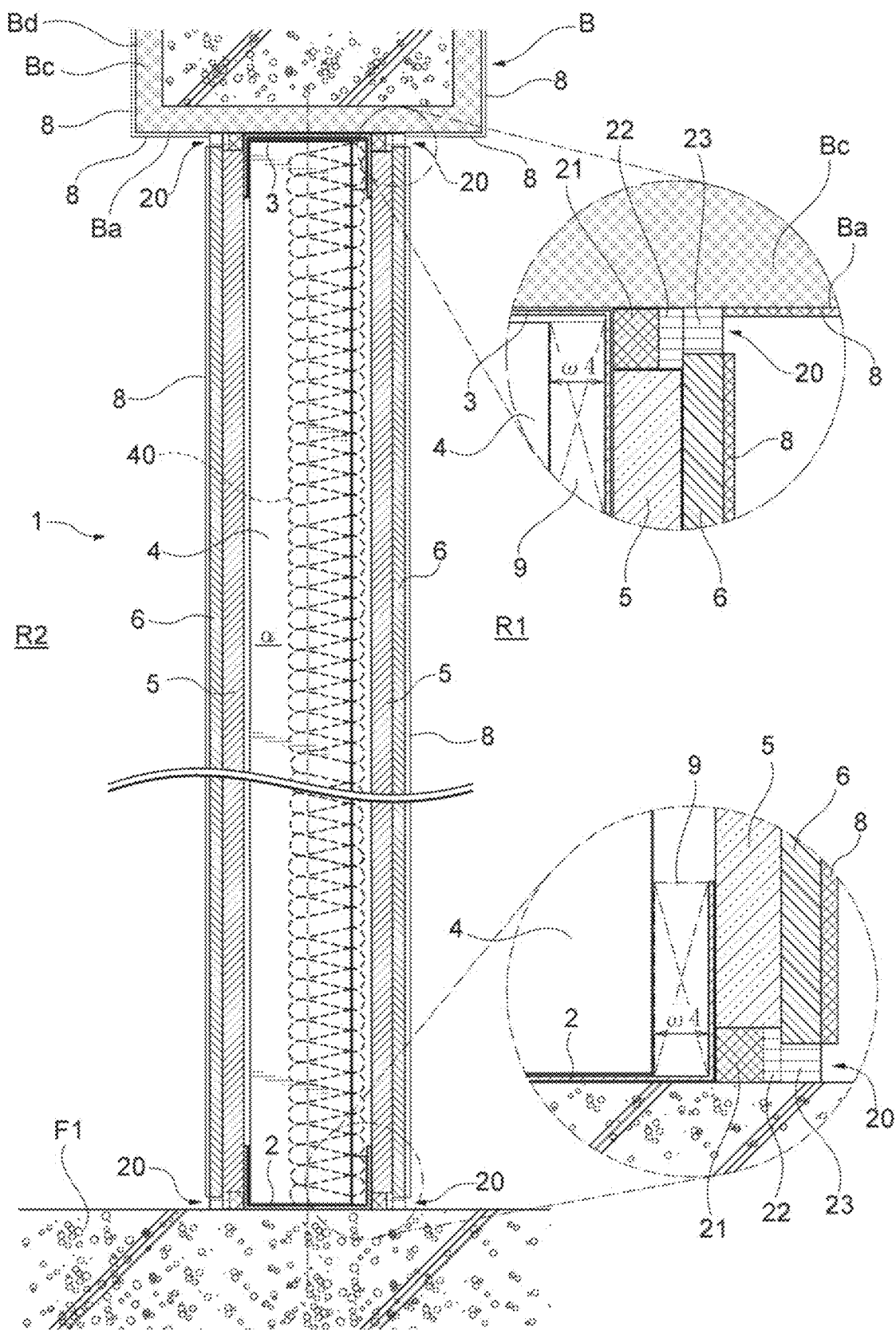

[Fig. 5]
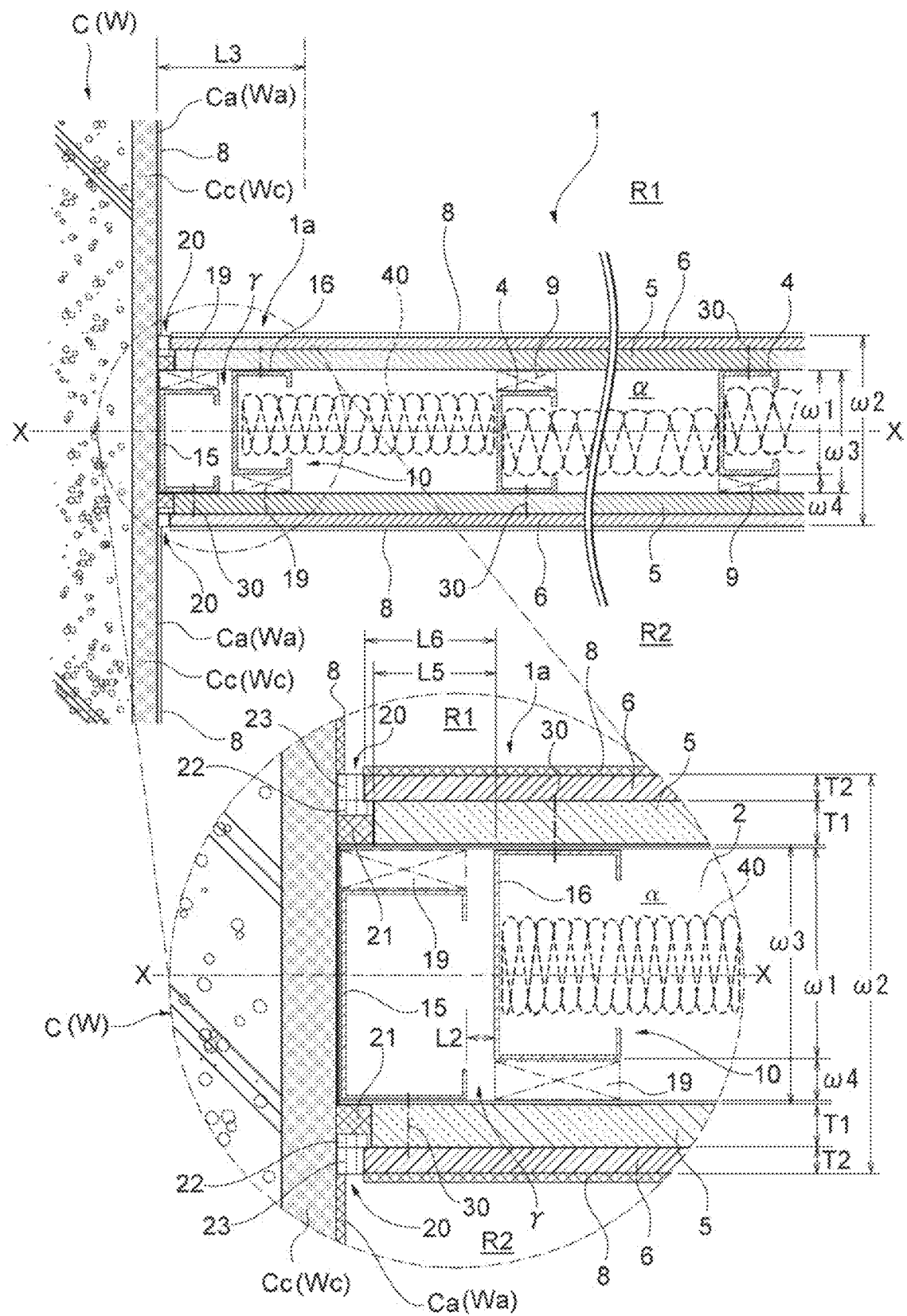

[Fig. 6]
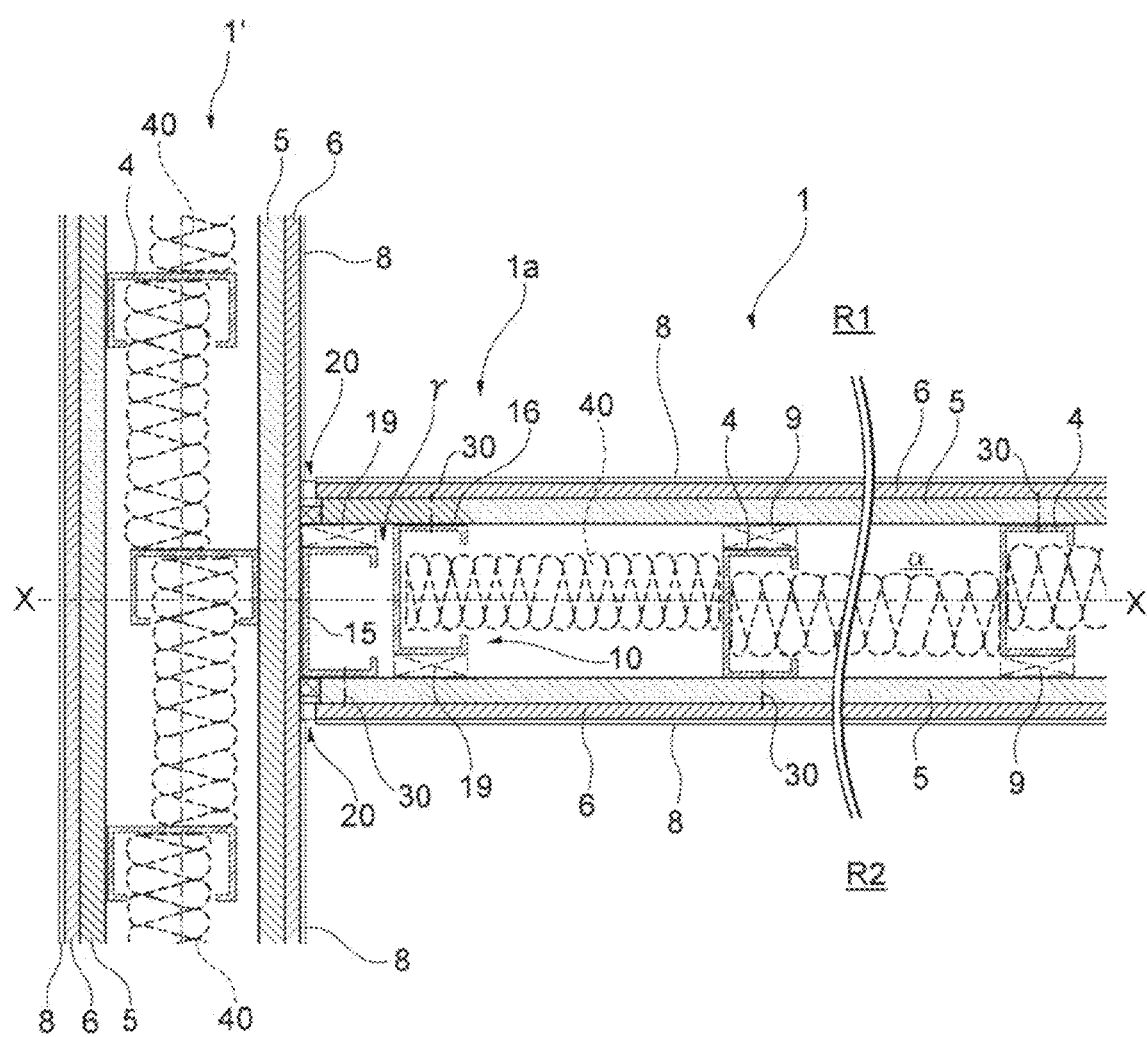

[Fig. 7]
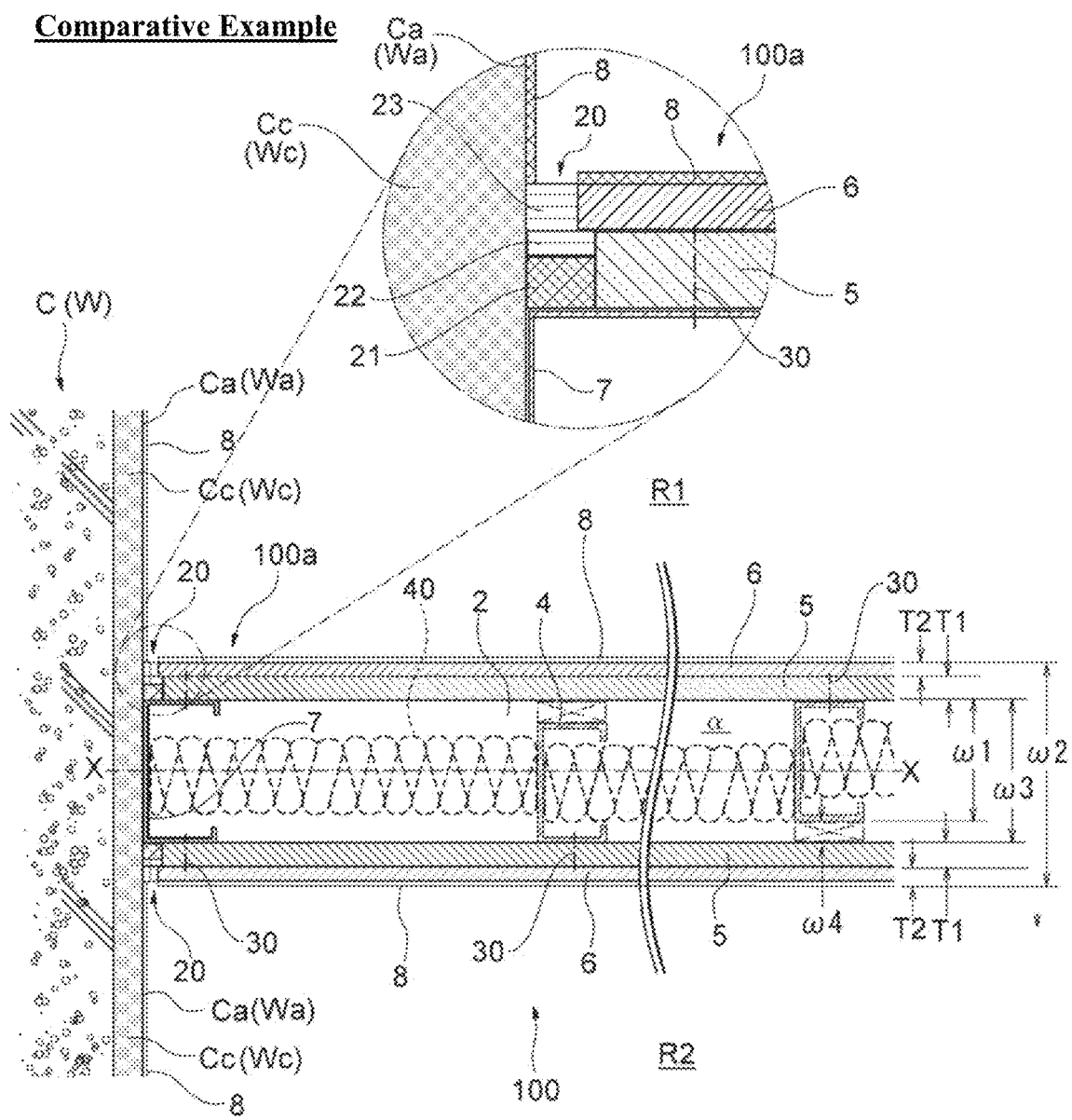

[Fig. 8]
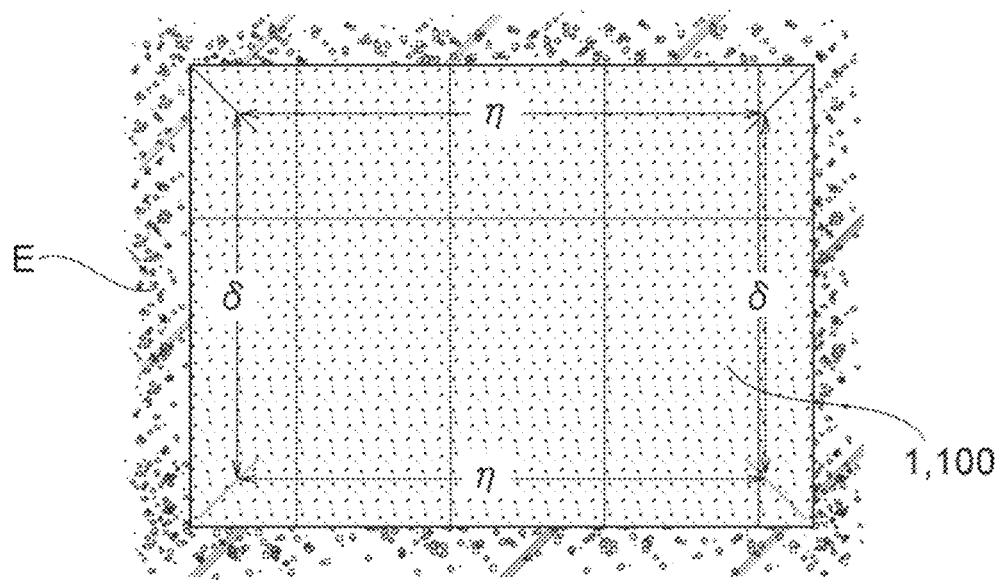

[Fig. 9]
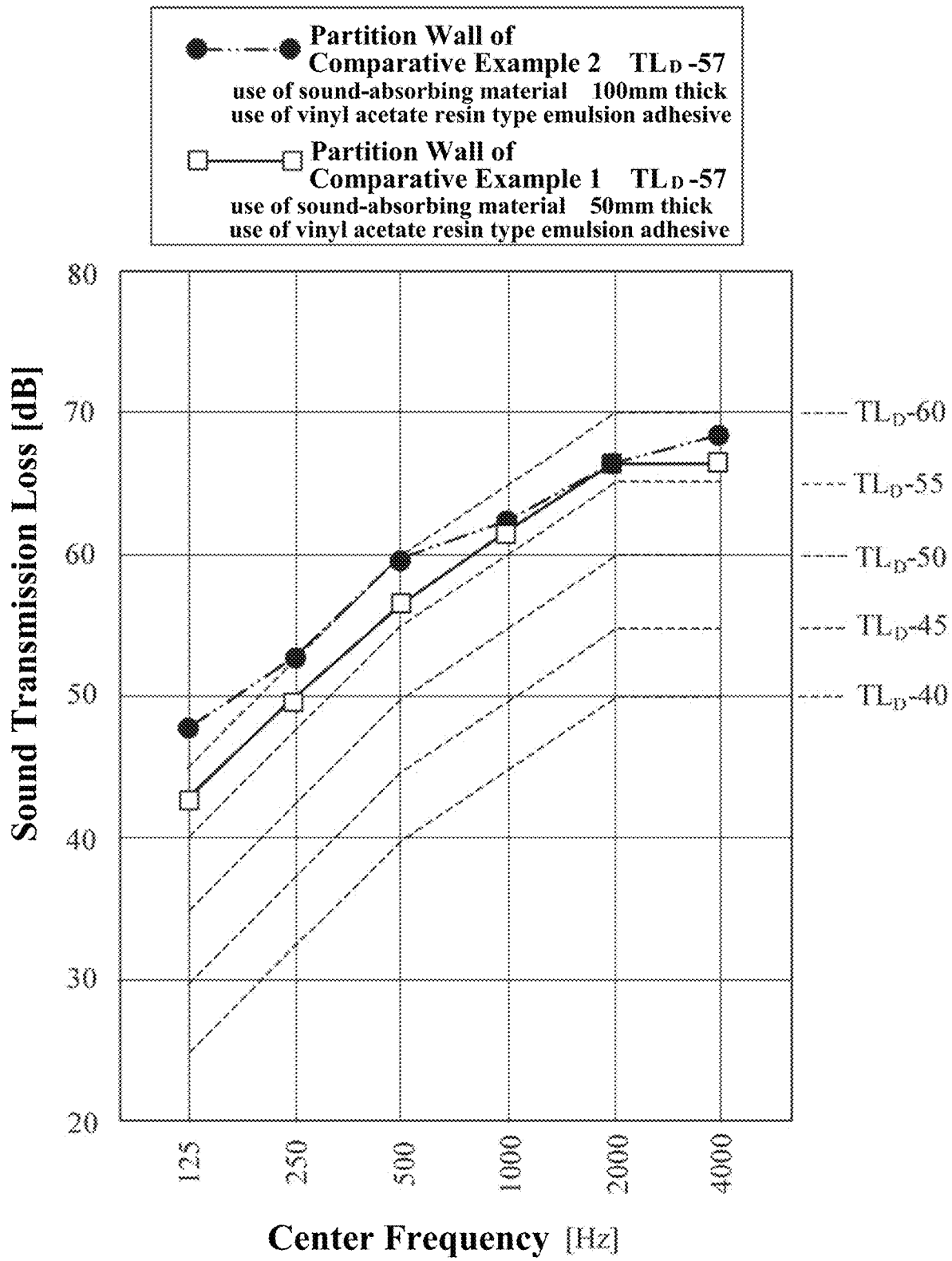

[Fig. 10]
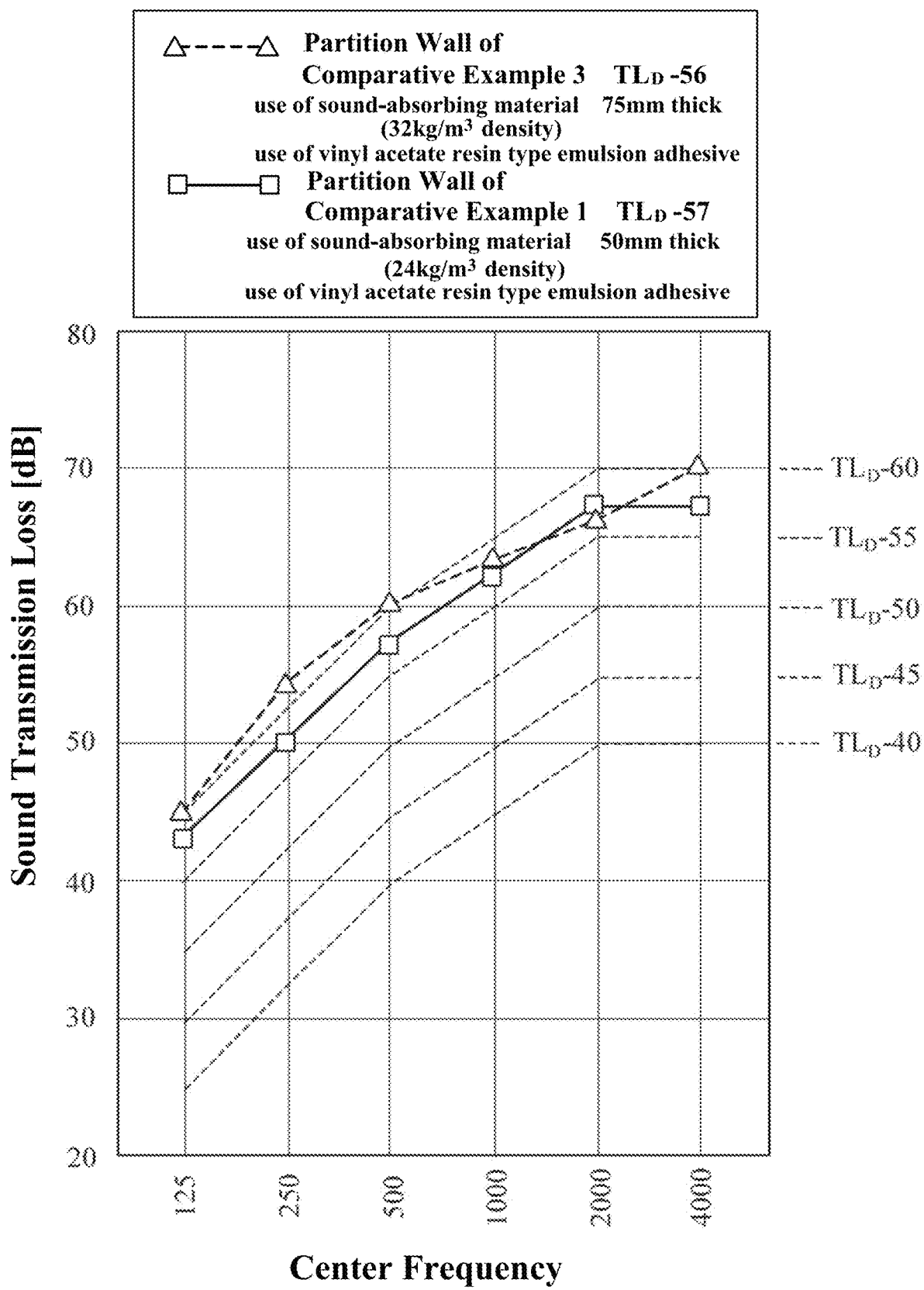

【Fig. 11】
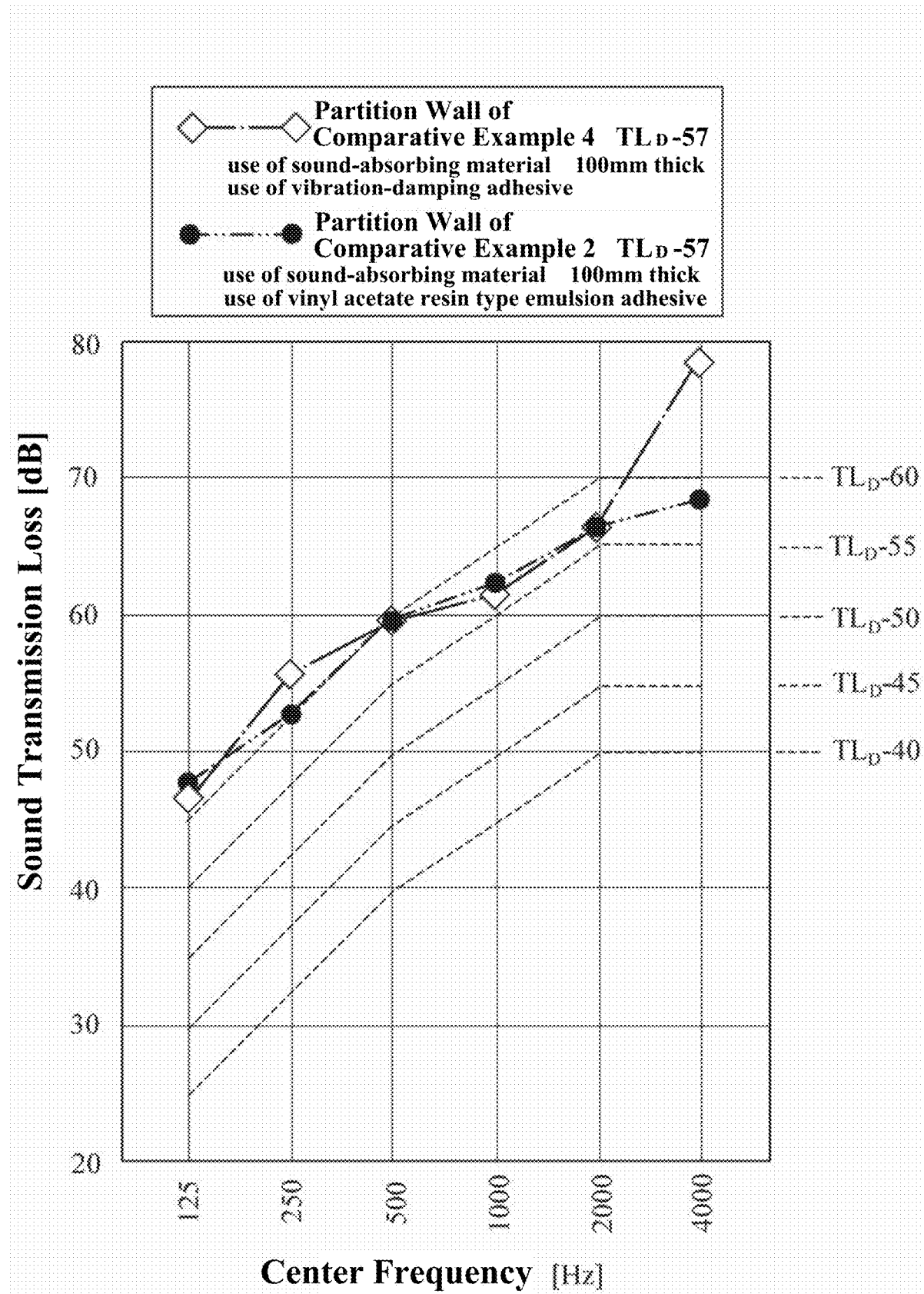

[Fig. 12]
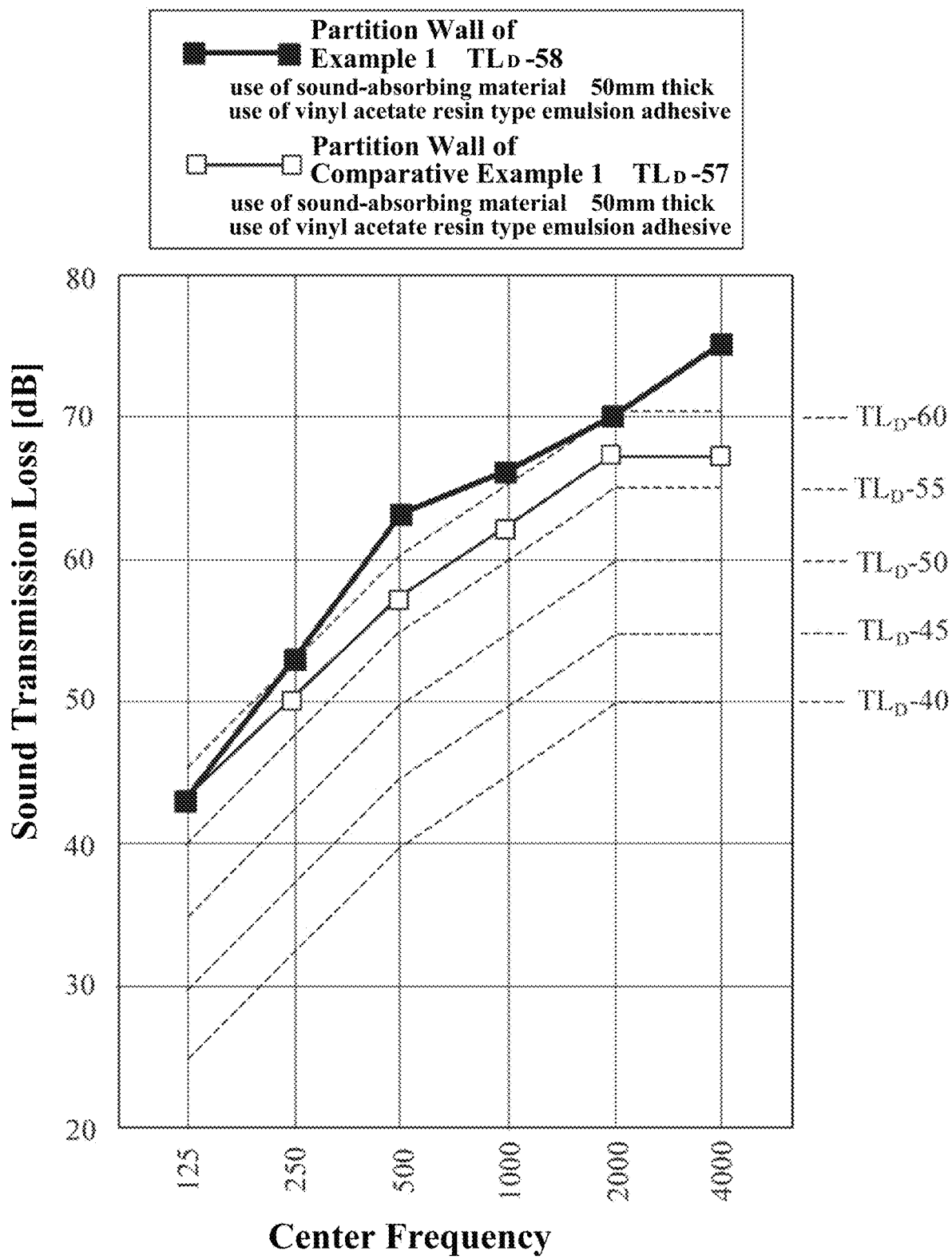

[Fig. 13]
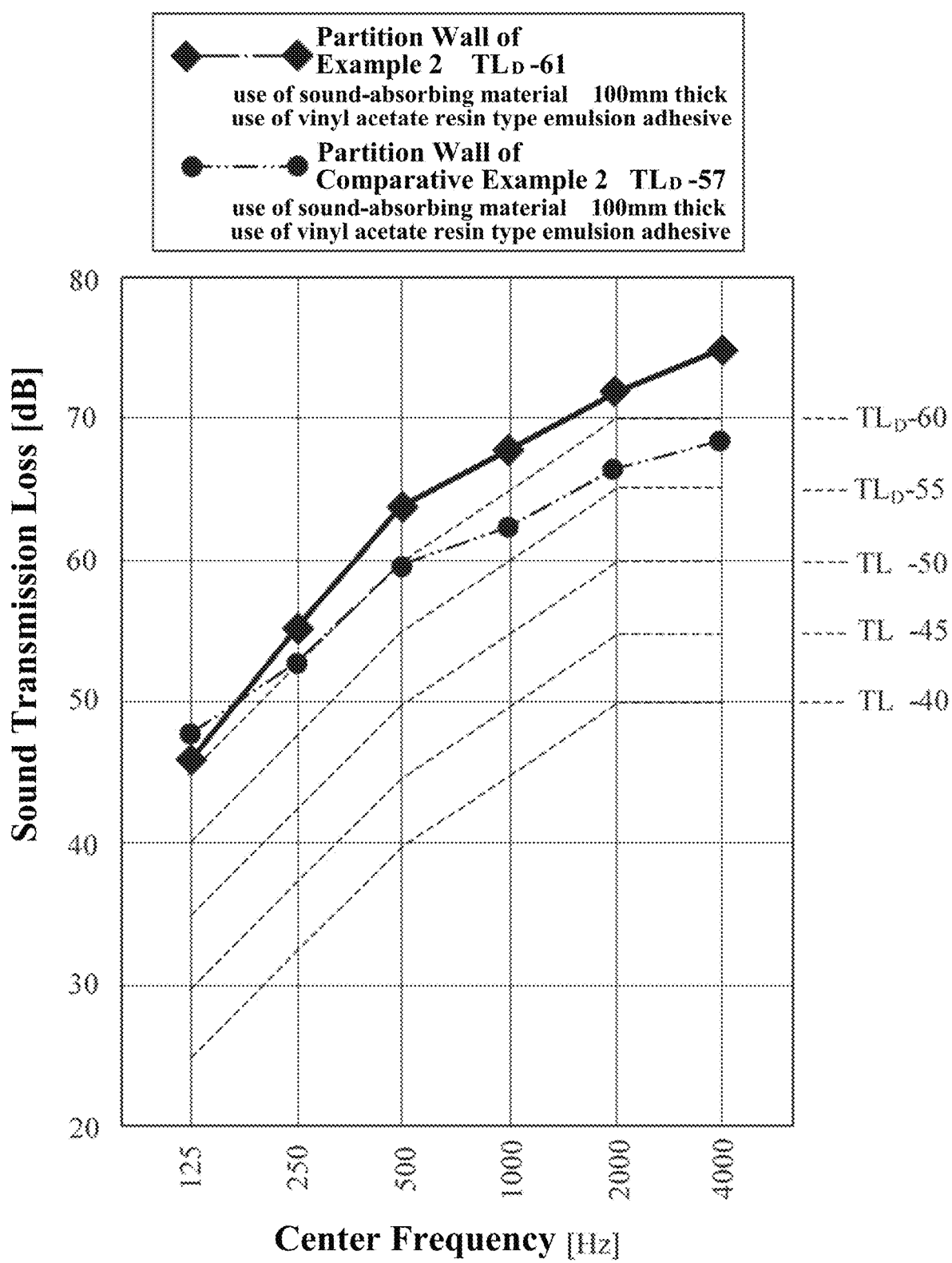

[Fig. 14]
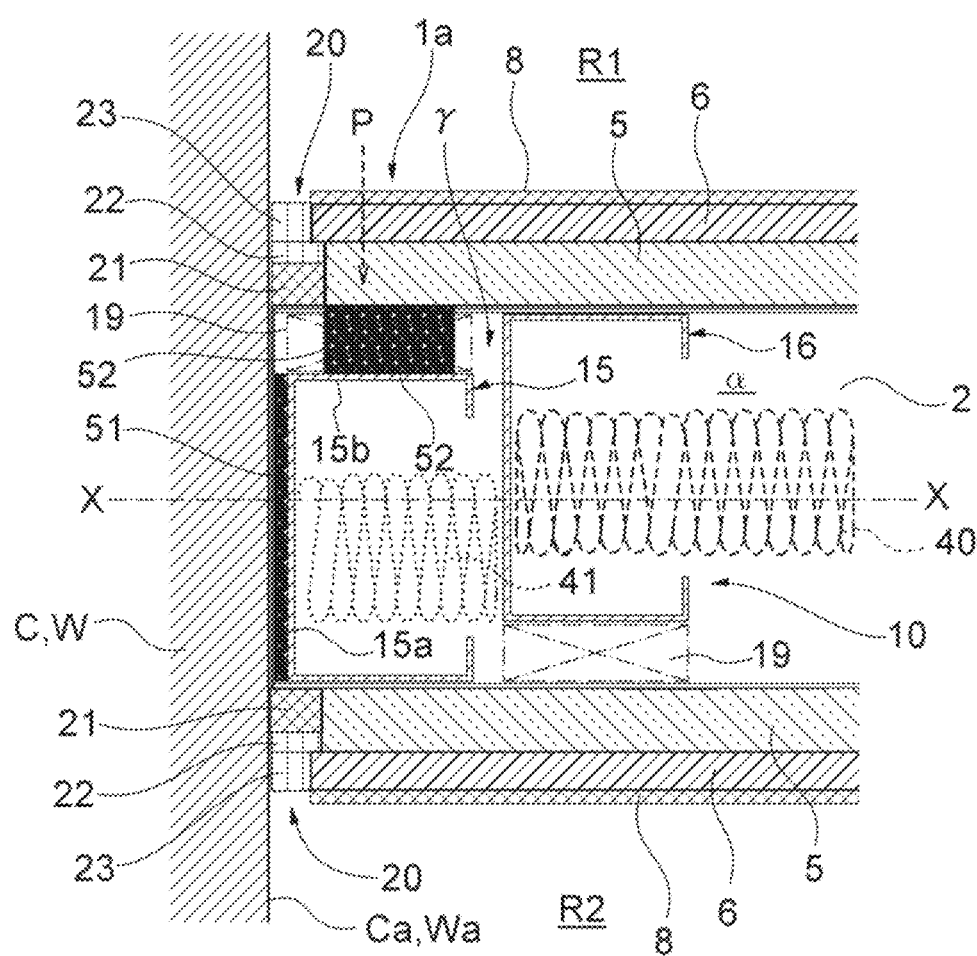

【Fig. 15】
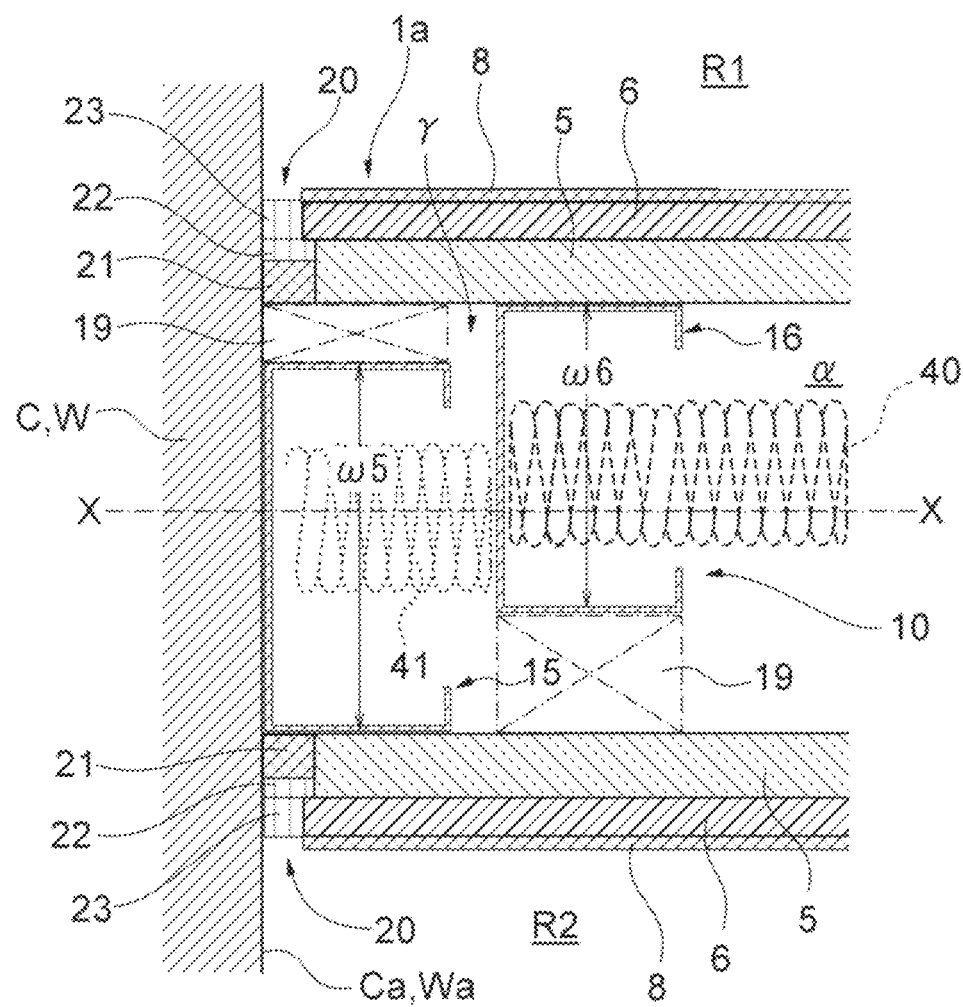

[Fig. 16]
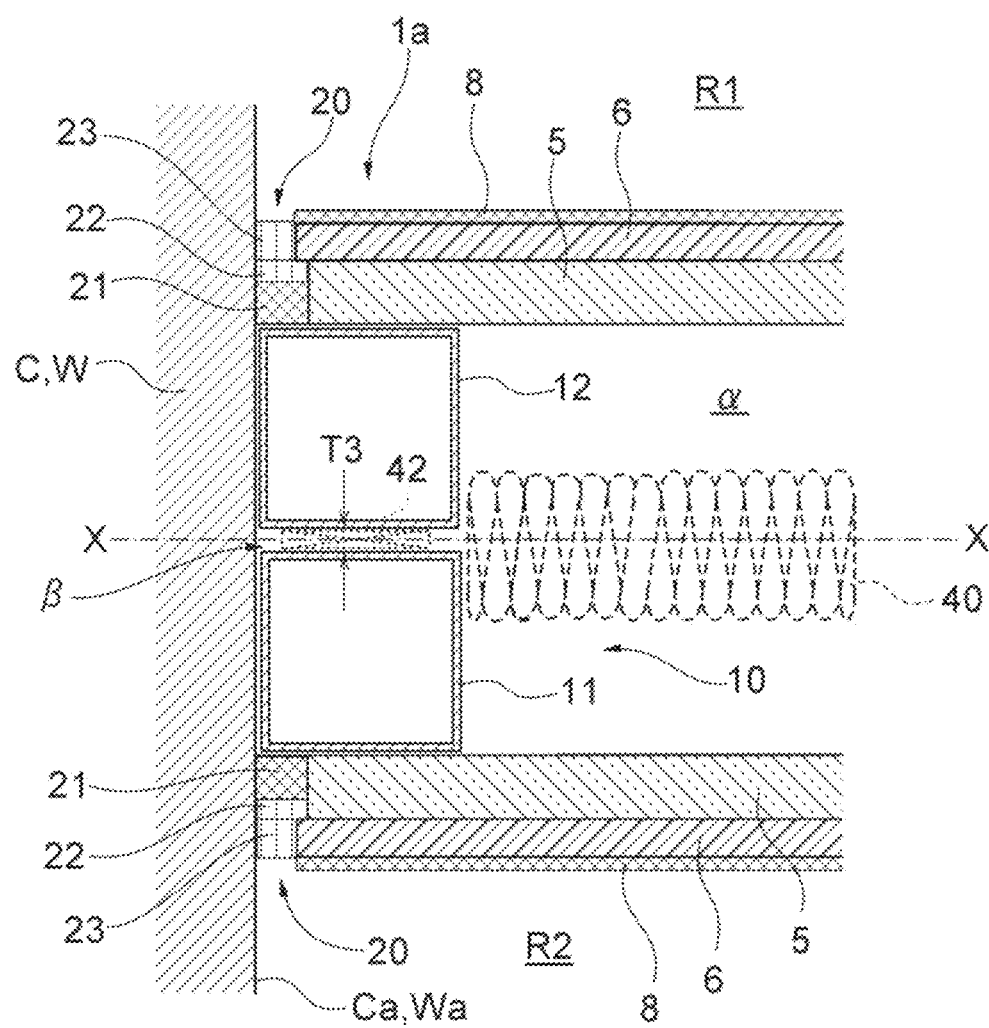

[Fig. 17]
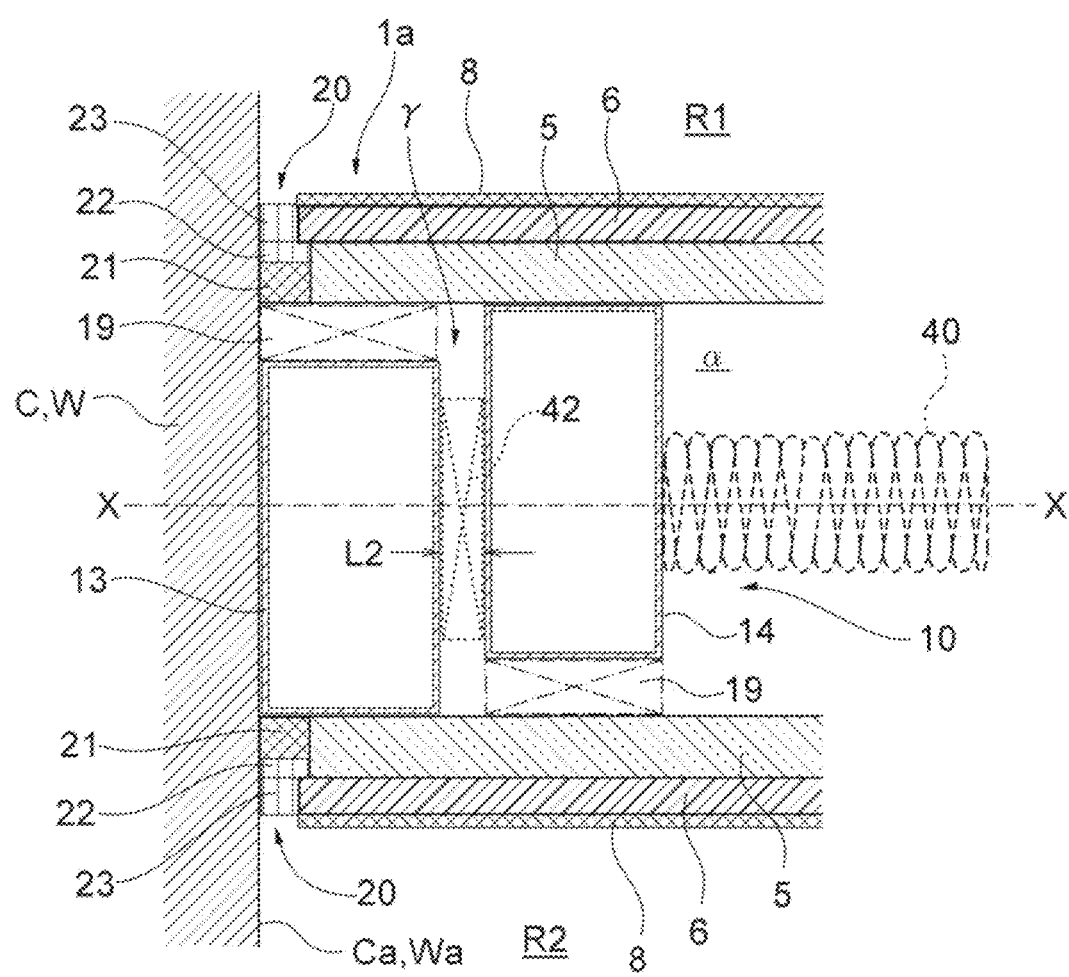

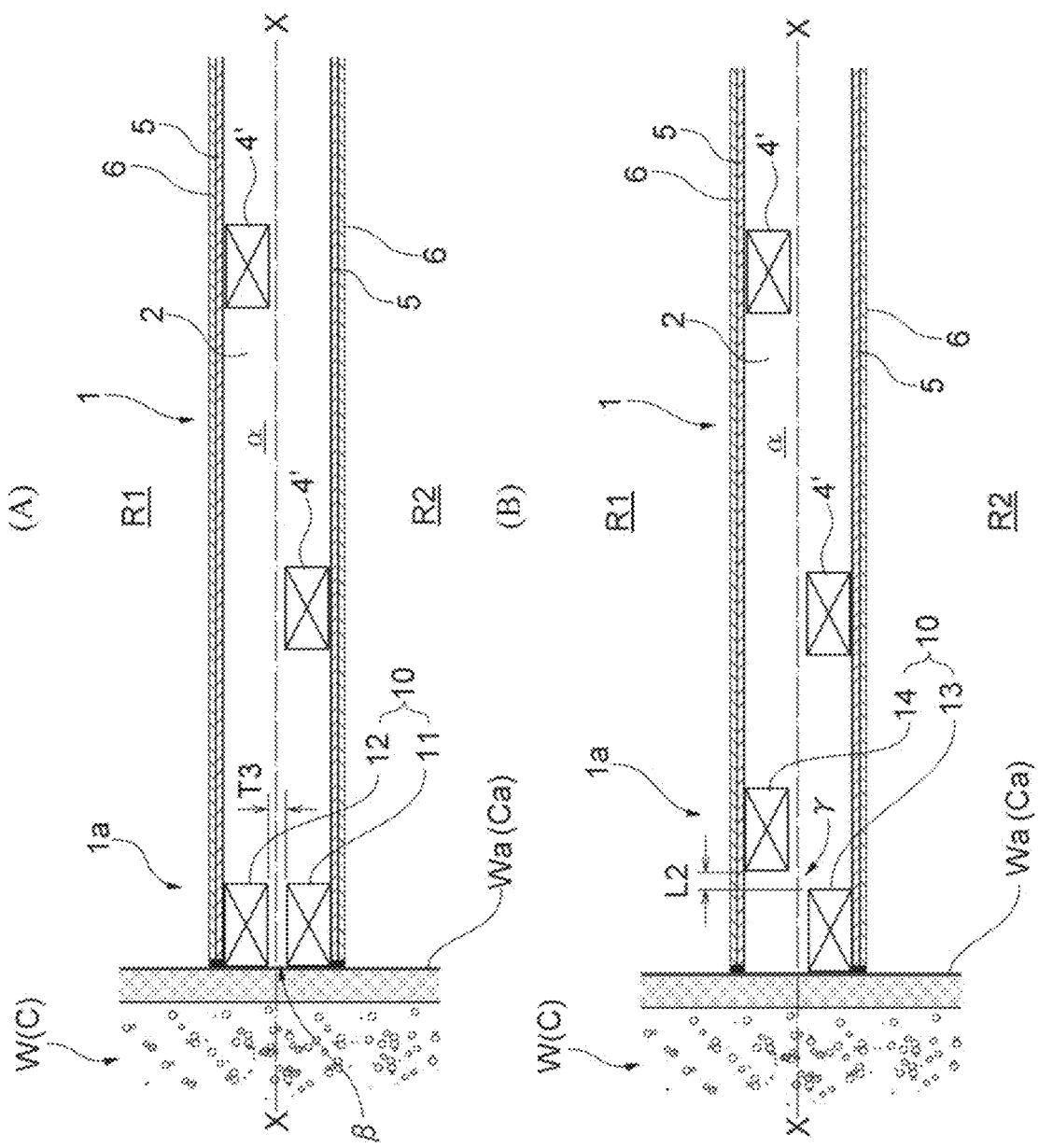

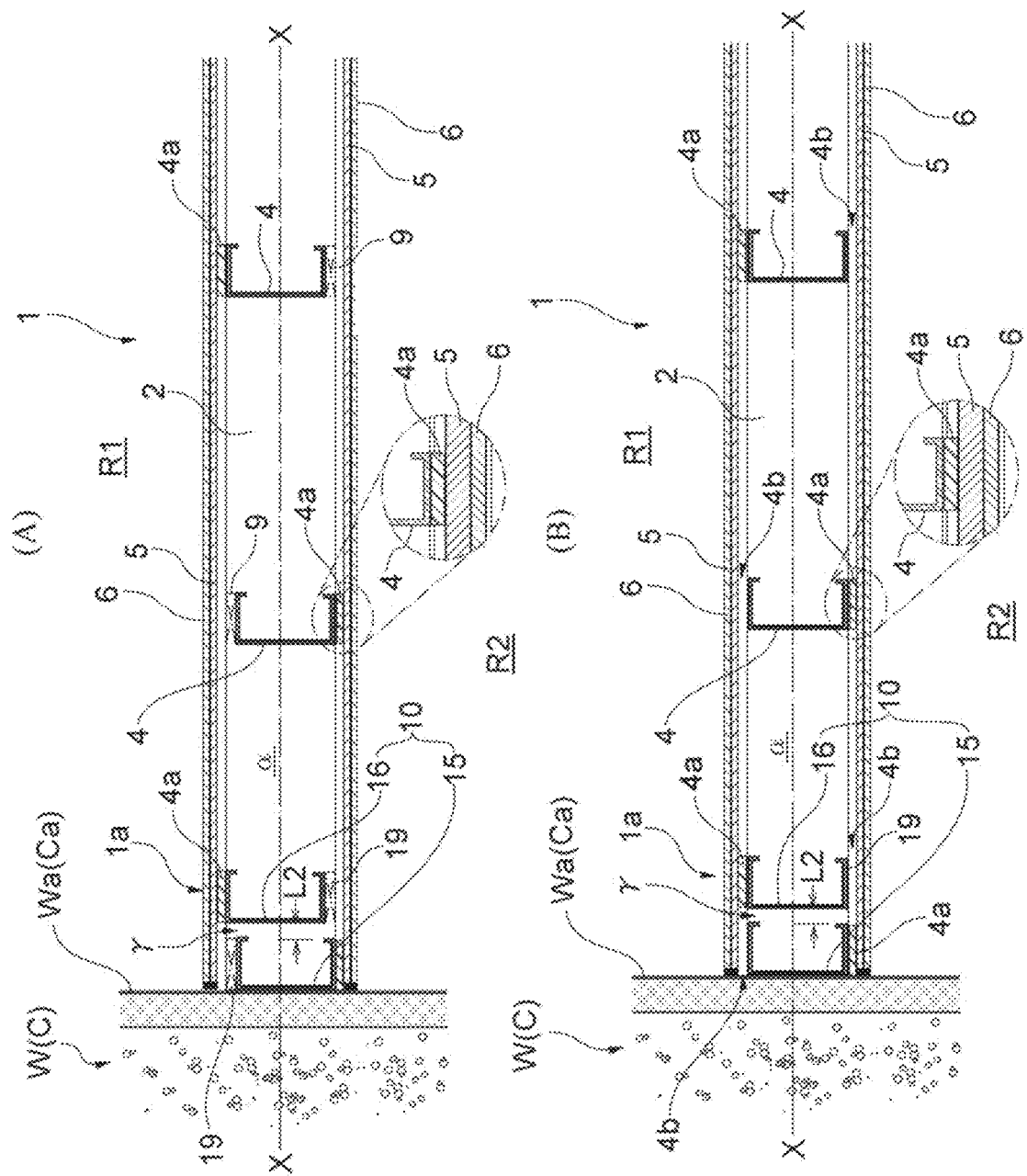
[Fig. 19]

[Fig. 20]
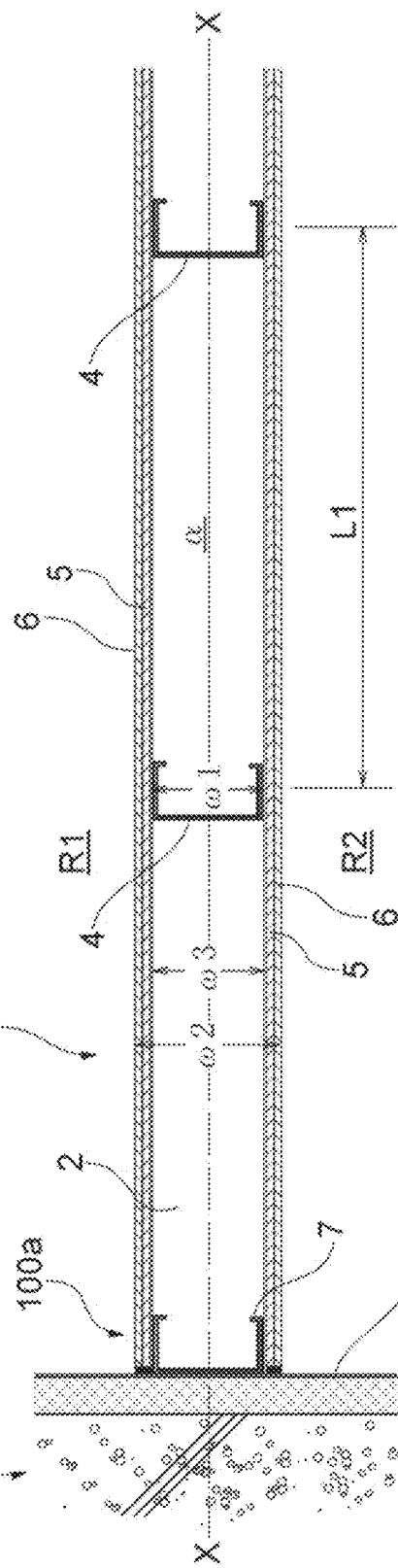
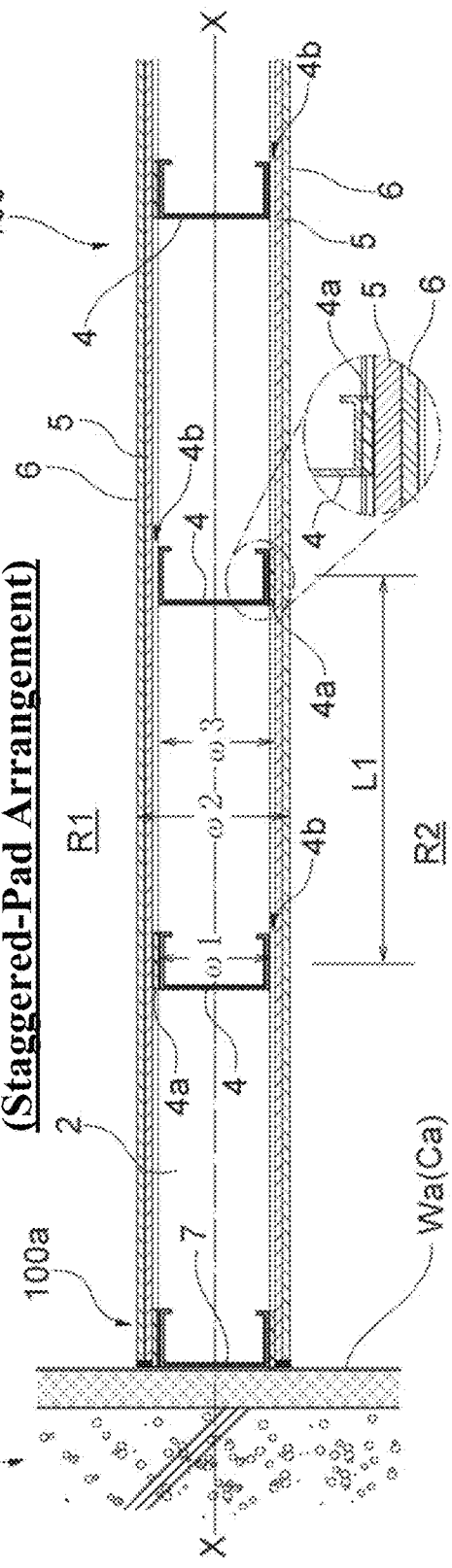

[Fig. 21]
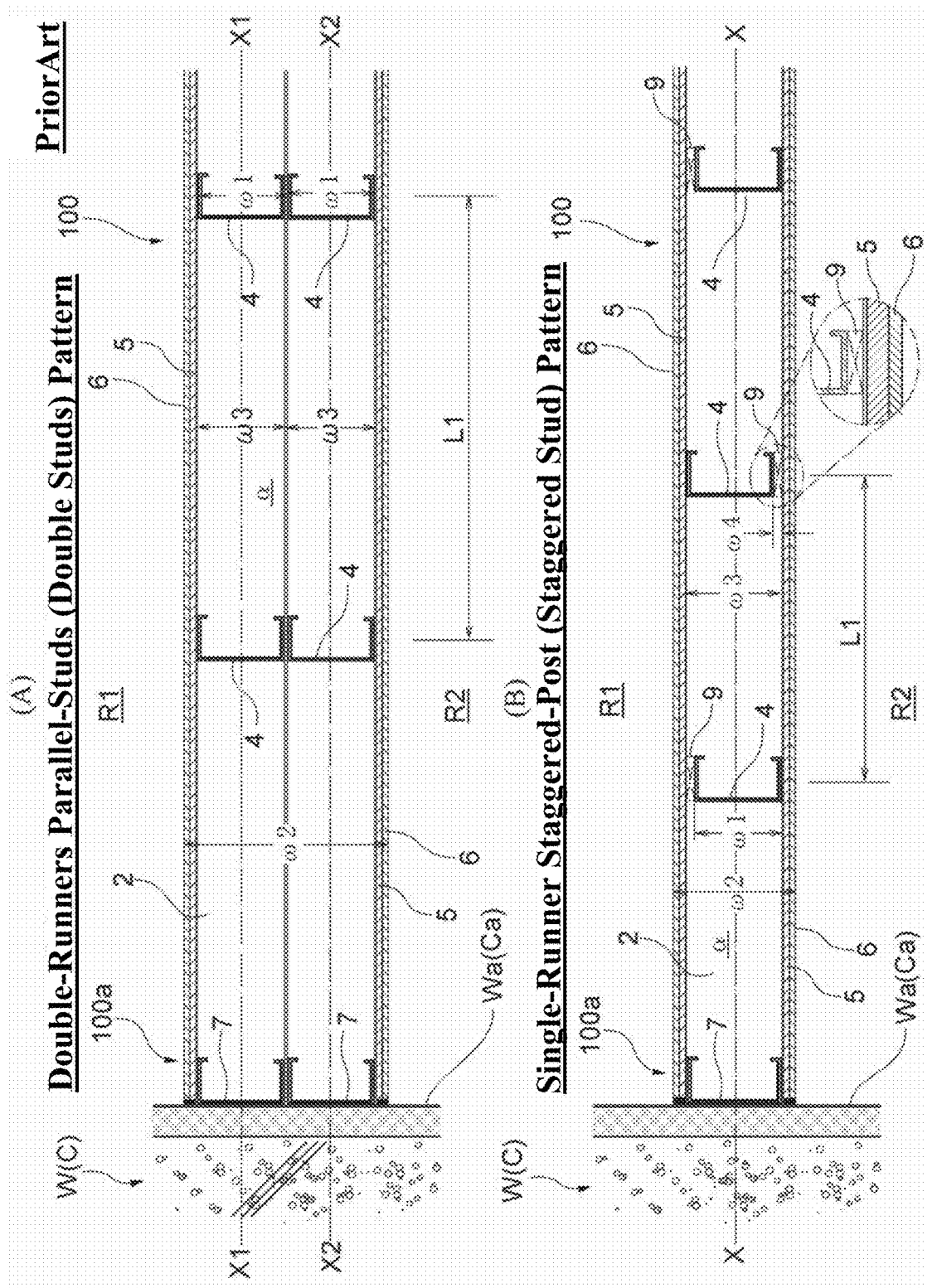

PARTITION WALL STRUCTURE AND METHOD FOR CONSTRUCTING SAME

CROSS-REFERENCE TO RELATED APPLICATIONS

This application is a U.S. National Stage Application which claims the benefit under 35 U.S.C. § 371 of International Patent Application No. PCT/JP2019/007545 filed on Feb. 27, 2019, which claims foreign priority benefit under 35 U.S.C. § 119 of Japanese Patent Application No. 2018-038125 filed on Mar. 4, 2018, in the Japanese Intellectual Property Office, the contents of all of which are incorporated herein by reference.

TECHNICAL FIELD

The present invention relates to a structure of a partition wall and a method for constructing the partition wall, and more specifically, such a structure and method for constructing the partition wall in a single-runner staggered-stud pattern or a single-runner staggered-pad pattern, which is, in general, built as a party wall, a boundary wall, a fire-resisting wall, and so forth in a high-rise or middle-rise building and which can exhibit an improved sound-insulation performance.

BACKGROUND ART

In general, a partition wall of a building requires various kinds of performances, such as a fire-protecting ability, fire-resisting ability, sound-insulation performance, vibration-isolating performance, thermal-insulation performance, or security performance. In particular, the sound-insulation performance of the partition wall tends to be focused in recent years, as the property for improving the independency and habitability of each of dwelling units or rooms.

A dry-type partition wall with a hollow structure is known as a non-loadbearing wall constructed in a high-rise or middle-rise building, such as a housing complex. A partition wall with light gauge steel (LGS) studs is known as such a dry-type partition wall with the hollow structure. This wall comprises interior finishing panels (architectural interior finishing boards), such as gypsum boards or calcium silicate boards, attached to the studs. A partition wall without the studs is also known as the dry-type partition wall. This wall is constructed by interior finishing panels with reinforcement ribs or the like for sustaining the panels in their self-standing condition (in general, this kind of wall structure is called as a non-studs structure or stud-less structure). The dry-type partition walls built by such dry-type construction methods are advantageous from a viewpoint of workability in the building construction process, reduction in the weight of the building, and so forth. Therefore, the dry-type partition walls are widely used as party walls, boundary walls, fire-resisting walls, and so forth, in the high-rise or middle-rise buildings.

In general, the dry-type partition wall with the hollow structure, which is constructed with the use of the steel studs, comprises "steel furrings for wall and ceiling in buildings" (JIS A 6517 standard products, its equivalent, compliant or compatible products, and so forth) and interior finishing panels, as described in Non-Patent Literature 1. The steel furrings include steel studs, steel runners, steady braces, spacers, and so forth. The interior finishing panels are fixed to the studs by fixing devices or fixing materials, such as screws, staples, adhesives, and so forth. Such a partition wall is widely known as a so-called "lightweight partition wall", "light gauge steel partition wall", or the like. A method for constructing this kind of partition wall can be classified into the following construction methods in relation with a type or style of arrangement or formation of the studs:

(1) Single-runner common-stud (single stud) pattern
(2) Double-runners parallel-studs (double studs) pattern
(3) Single-runner staggered-stud pattern In the present specification, the term reading "light gauge steel" material includes a "steel stud" and a "steel runner" as described in JIS A 6517 ("Steel furrings for wall and ceiling in buildings").

FIGS. 20 and 21 are horizontal cross-sectional views, in which configurations of the partition wall structures according to these three types of construction methods are illustrated schematically. In each of FIGS. 20 and 21, a partition wall 100 comparts architectural spaces R1, R2, such as rooms, habitable rooms, corridors, and so forth. The wall 100 is mainly constructed by a lower runner 2, an upper runner (not shown), steel studs 4, substrate layer boards 5, and surface layer boards 6. The lower runner 2 is laid on a floor structure, whereas the upper runner is located at a ceiling area. The studs 4 constitute intermediate steel posts, and the boards 5, 6 are supported by the studs 4. The studs 4 are arranged, spaced apart from each other at a predetermined distance L1. Usually, the distance L is set to be approximately 150, 230, 450, or 600 mm. In each of the figures, an end portion 100a of the wall 100 is butted against a wall surface Wa of a wall W (or a vertical surface Ca of a column C). The wall 100 extends along its centerline X-X, as a whole. If the term "steel stud" is replaced with "wooden stud" and the term "runner" is replaced with "wooden sill" or "wooden horizontal member", it is possible to assume that the types of construction methods as illustrated in FIGS. 20 and 21 correspond to the types of wooden structure partition walls. Therefore, in a broad sense, the term "stud" includes the wooden stud and so forth, and the term "runner" includes the wooden sill, the wooden horizontal member, and so forth.

FIG. 20 (A) illustrates the structure of the partition wall constructed in the single-runner common-stud pattern. The wall 1 has the runners 2, the studs 4, and so forth arranged in alignment with its centerline X-X. The boards 5, 6 are integrally fixed to both sides of the studs 4. If desired, a thermal-insulating and sound-absorbing material (not shown), such as glass wool, is inserted or charged in an inside space α of the wall 1. The structure of the partition wall built by this construction method is a conventional and typical structure of the partition wall, and this is disclosed in, e.g., Non-Patent Literature 1.

In the structure of the partition wall constructed in the single-runner common-stud pattern as illustrated in FIG. 20 (A), the boards 5, 6 on both sides are fixed to the common studs 4 so that a path for propagating solid propagation sound is generated by the boards 5, 6 and the studs 4. Thus, noise caused in the architectural space (room, corridor, and so forth) on one side of the wall 1 is apt to propagate to the architectural space on the opposite side of the wall 1 through this propagating path. Therefore, it is difficult to desirably improve a sound-insulation performance of the wall 1.

In FIG. 20(B), a modification of the wall structure as shown in FIG. 20(A) is illustrated, wherein battens or backing pads 4a are interposed between the studs 4 and the substrate layer boards 5 in a staggered formation and wherein gaps 4b are alternately formed between the studs 4 and the boards 5 (this pattern of the construction method is referred to as "single-runner staggered-pad pattern" hereinafter). If desired, the thermal-insulating and sound-absorbing material (not shown), such as glass wool, is inserted or charged in the inside space α of the wall 1. This type of partition wall structure is disclosed in, e.g., Patent Literature 1 (Japanese Patent Laid-open Publication No. 2010-242298). The wall structure, which is provided with the pads 4a interposed therebetween as buffers and the gaps 4b arranged in the staggered formation, is advantageous in isolation of the solid propagation sound, but an additional construction work is required for installation of the pads 4a, each having a specific material property and sound-insulation property.

FIG. 21(A) illustrates a structure of partition wall constructed in the double-runners parallel-studs pattern. This wall structure has a double wall configuration which comprises the upper and lower steel runners (only the lower runners 2 is shown in FIG. 21(A)) and the studs 4 arranged in parallel rows. The studs 4 of the first row centered on a center axis X1-X1 support the boards 5, 6 on the side of the architectural space R1, whereas the studs 4 of the second row centered on a center axis X2-X2 support the boards 5, 6 on the side of the architectural space R2. If desired, the thermal-insulating and sound-absorbing material (not shown), such as glass wool, is inserted or charged in the inside space α of the wall 1. This type of partition wall structure is disclosed in, e.g., Patent Literature 2 (Japanese Patent Laid-open Publication No. 2005-133414).

The partition wall 100 constructed in the double-runners parallel-studs pattern has substantially completely independent rows of the studs 4 and the runner 2, and the boards 5, 6 facing to each of the spaces R1, R2 are securely fixed to the studs 4 of the corresponding row. The inside space α is a considerably large air space, the thickness of which is substantially twice as large as the width ω1 of the runner 2. Therefore, the thermal-insulating and sound-absorbing material (not shown), such as glass wool or rock wool, can be appropriately inserted or charged in the inside space α. This is advantageous for improving the sound-insulating property of the wall structure. In addition, the path for propagating the solid propagation sound can be surely interrupted in the partition wall, according to this pattern. Therefore, the wall structure can be so designed as to prevent a sound-insulation defect and so forth from occurring, thereby exhibiting the effective sound-insulation performance. In the partition wall 100, however, the overall thickness of the wall ω2 is doubled in comparison to the thickness of the wall of the single-runner common-stud pattern (FIG. 20 (A)). It follows that an effectively usable area or space in the habitable room is considerably reduced or restricted. This is an unfavorable condition in architectural design, or this results in an economical disadvantage of the building.

In FIG. 21(B), there is shown the partition wall structure of the single-runner staggered-stud pattern. In the wall structure of this pattern, the studs 4 are arranged in a staggered arrangement, wherein the studs are decentered alternately on either one side with respect to the wall centerline X-X by installation of spacers 9. Each of the studs 4 supports only the boards 5, 6 for the architectural space on either one side, and the stud 4 is spaced apart from the boards 5, 6 for the architectural space on the opposite side. The partition wall with this structure is disclosed in, e.g., Japanese Patent Publications Nos. 4971876, 5663119, and 5296600 listed in the Patent Literatures.

According to the partition wall structure constructed in the single-runner staggered-stud pattern, the path for propagating the solid propagation sound is not generated, similarly to the partition wall of the single-runner staggered-pad pattern (FIG. 20 (B)). Therefore, it is possible to design the wall structure which can exhibit the relatively effective sound-insulation performance, although it is somewhat inferior in the sound-insulation performance compared to the wall of the double-runners parallel-studs pattern (FIG. 21 (A)). Further, the single-runner staggered-stud pattern does not require specific consideration in structural design, detail design, or construction work, in relation to the installation of the pads 4a (FIG. 20 (B)). In addition, as compared with the wall of the single-runner common-stud pattern (FIG. 20 (A)), the wall thickness ω2 of the wall of the single-runner staggered-stud pattern is increased only slightly, and therefore, the effectively usable area or space in the habitable room is merely slightly reduced or restricted.

For instance, provided that a C-shaped steel stud with the width ω1 of 65 mm is used as the stud 4 in each of the patterns as set forth above and gypsum boards with 21 mm and 9.5 mm in thickness are used as the boards 5, 6 respectively, the wall thickness ω2 of the walls 1 is approximately 125 mm in a case of the single-runner common-stud pattern as shown in FIG. 20 (A), approximately 200 mm in a case of the double-runners parallel-studs pattern as shown in FIG. 21(A), and approximately 135 mm in a case of the single-runner staggered-stud pattern as shown in FIG. 21(B) (provided that the width ω3 of the runner 2 is 75 mm), respectively.

In any of the respective patterns, end edges of the boards 5, 6 are positioned at the end portion 100a of the wall 100. Therefore, stable support and construction workability of the boards 5, 6 at the end portion 100a should be taken into consideration. Thus, at an end portion 100a, a steel stud 7 is vertically erected or stood, which is a steel stud with a C-shaped cross-section having the width ω3 substantially equal or equivalent to the width of the runner 2. In general, the stud 7 is called "vertical runner", "end runner", "end stud", or the like. This building element is referred to as "end post" hereinafter.

The present applicant has developed an extremely high-performance sound-insulation wall structure (Type A-2000 WI) constructed in the single-runner staggered-stud pattern (FIG. 21(B)), which has been already put into practical use. The thickness of this wall structure is set to be approximately 135 mm. However, it is known that this wall structure takes the sound-insulation performance corresponding to the $TL_D$ value equal to 56, which is equivalent to the sound-insulation performance of a reinforced concrete wall with 260 mm in thickness. This high-performance sound-insulation wall structure (Type A-2000 WI) has been preferably employed as a partition wall installed in a hotel, housing complex, and so forth, especially in a high-rise hotel, a high-rise housing complex, and so forth, since the partition wall of such a building requires the high-performance sound-insulation effect. This wall system is significantly advantageous, due to not only its excellent sound-insulation effect, but also a contribution to a reduction in a structural load of the building resulting from the reduction in the weight of the wall, shortening of a construction period, and so forth. The TLD value (D-Number of Sound Transmission Loss) is a value indicating the sound-insulation effect or performance of a partition wall, which is obtained by measurement of sound transmission loss, wherein the measurement is carried out in accordance with the measuring method as standardized in JIS A 1416 (ISO140-3). More specifically, the $TL_D$ value is an indication of the sound-insulation effect or performance of the partition wall, which is obtained by evaluating the measurement results on the basis of the sound-insulation reference curve, wherein the curve has been standardized by the Architectural Institute of Japan.

CITATION LIST

Patent Literatures

[Patent Literature 1] Japanese Patent Laid-open Publication No. 2010-242298
[Patent Literature 2] Japanese Patent Laid-open Publication No. 2005-133414
[Patent Literature 3] Japanese Patent Publication No. 4971876
[Patent Literature 4] Japanese Patent Publication No. 5663119
[Patent Literature 5] Japanese Patent Publication No. 5296600

Non-Patent Literatures

[Non-Patent Literature 1] Japanese Architectural Standard Specification and Explanation of the Specification, the Architectural Institute of Japan, JASS 26, "Interior Finishing Work"

SUMMARY OF INVENTION

Technical Problem

As described above, the partition wall structure constructed in the double-runners parallel-studs pattern exhibits a desirable sound-insulation performance, but the thickness of the wall constructed in this pattern is significantly increased. On the other hand, in the partition wall constructed in the single-runner staggered-stud pattern or the single-runner staggered-pad pattern, the wall thickness is increased merely slightly, and therefore, the problem regarding the increased wall thickness is avoidable. However, it is desirable to improve the sound-insulation performances of the partition walls constructed in the single-runner staggered-stud pattern or the single-runner staggered-pad pattern, since these walls are somewhat inferior in the sound-insulation performance compared to the partition wall of the double-runners parallel-studs pattern.

In regard to the partition wall structure constructed in the single-runner staggered-stud pattern or the single-runner staggered-pad pattern, the present inventor et al. have carried out sound-insulation performance tests under various conditions, with respect to a number of specimens of sound-insulating walls. The specimens have been modified for various technical approaches or solutions. The modification includes an increase of the thickness or density of the thermal-insulating and sound-absorbing material (glass wool or the like) in the inside space of the wall, use of a vibration-damping adhesive or the like for adhering the boards to each other, and so forth. As the results of the tests, it has been recognized that the acoustic transmission loss is difficult to be effectively increased in middle and high frequency ranges (500-2000 Hz). Therefore, the sound-insulation performance cannot be desirably improved by such technical approaches or solutions. Further, in the tests, a significant sound-insulation defect at a specific frequency has not been found. Therefore, it has been considered that a further or additional improvement of the sound-insulation performance is, in fact, very difficult to be achieved.

An object of the present invention is to provide a partition wall structure constructed in the single-runner staggered-stud pattern or the single-runner staggered-pad pattern, which can increase the acoustic transmission loss in the high and middle frequency regions, thereby improving the sound-insulation performance of the partition wall.

Solution to Problem

For improvement of the sound-insulation performance of the partition wall constructed in the single-runner staggered-stud pattern or the single-runner staggered-pad pattern, the present inventor et al. have prepared test specimens for sound-insulation performance tests, and have carried out a number of sound-insulation performance tests under different testing conditions. For instance, the test specimens, which have undergone testing, include the specimens of the partition walls, each having the thermal-insulating and sound-absorbing material, such as glass wool, with a different thickness or density; the specimens of the partition wall constructed with the use of a specific kind of adhesive, such as a vibration-damping adhesive, for adhering the surface layer boards onto the substrate layer boards; the specimens of the partition walls, each having a wall end portion with a different structure. As the results of the tests, the present inventor et al. have recognized a phenomenon such that the structure of the wall end portion uncovered to the interior space has remarkable influences or significant effects on the sound-insulation performance of the wall. After the subsequent researches conducted by the present inventor et al., it has been found out that the acoustic transmission loss with respect to the noise of the middle or high frequency region can be increased by dividing the end post located at the wall end portion into a plurality of post elements spaced apart from each other, whereby the sound-insulation performance of the partition wall can be improved. Thus, the present inventor et al. have achieved the present invention relating to the partition wall structure and the construction method of the partition wall, as described hereinafter.

The present invention provides a structure of a partition wall to be constructed in a single-runner staggered-stud pattern or a single-runner staggered-pad pattern, wherein the wall has a wall end portion which is butted against another building structure in continuity therewith and which is exposed to architectural spaces at least partially, comprising:

an end post located at said wall end portion and constituted from first and second end post elements; and a gap or an isolation zone spacing said elements from each other and interrupting a propagation of a solid vibration or insulating a path for propagating the solid vibration;

wherein an interior finishing panel for defining the architectural space on one side of the wall is fixed to said first element and the interior finishing panel for defining the architectural space on an opposite side of the wall is fixed to said second element.

The present invention also provides a method for constructing a partition wall in a single-runner staggered-stud pattern or a single-runner staggered-pad pattern, wherein a wall end portion of the wall is butted against another building structure in continuity therewith so as to be exposed to architectural spaces at least partially, comprising:

constituting an end post to be located at an end portion of the wall, from first and second end post elements;

spacing said elements from each other to form a gap or an isolation zone therebetween for interrupting a propagation of a solid vibration or insulating a path for propagating the solid vibration; and fixing to said first element, an interior finishing panel for defining the architectural space on one side of the wall, and fixing to said second element, the interior finishing panel for defining the architectural space on an opposite side of the wall.

According to the present invention, the end post to be located at the wall end portion is divided into the first and second end post elements. The first and second elements are spaced apart from each other, so that the gap or the isolating zone is formed between the elements for interrupting the propagation of the solid vibration or insulating the propagation path for propagating the solid vibration. The gap is an air space in communication with an inside space of the wall, and the isolating zone is formed by a vibration-insulating material, such as a fibrous material, soft resin, rubber, elastomer, porous foam, and so forth, which is inserted or charged in the gap. The noise caused in the architectural space on the side of the first element may be propagated to the first element as the solid vibration, but the solid vibration of the first element is not propagated to the second element, since the gap or the isolating zone is formed between the first and second elements. Thus, emission of the solid propagation sound can be prevented from occurring in the architectural space on the side of the second element. Preferably, the wall end portion means the wall portion in a range of 200 mm measured from the other building structure in continuity with this partition wall, more preferably in a range of 150 mm measured therefrom.

According to the results of the sound-insulation performance tests conducted with respect to the specimens of the high-performance sound-insulation walls by the present inventor et al., the conventional walls exhibiting the sound-insulation performance corresponding to the $TL_D$ value equal to 57 can not be further improved in its sound-insulation performance in middle and high frequency ranges (500-2000 Hz), even if the thickness or density of the thermal-insulating and sound-absorbing material is increased or the vibration damping adhesive is used. The results of the tests, however, reveal that the sound-insulation performance of such a wall can be improved to be the $TL_D$ value in a range from 58 to 61, according to the present invention. That is, the high-performance sound-insulation wall exhibiting the sound-insulation performance corresponding to the $TL_D$ value equal to 57 has been considered to be no longer capable of further improvement in its sound-insulation performance, but the sound-insulation performance of such a wall can be further improved, in accordance with the present invention.

From another aspect of the invention, the present invention provides a partition wall with the structure as set forth above, which possesses the sound-insulation performance corresponding to the $TL_D$ value equal to or greater than 50. Further, the present invention provides a method for constructing a high-performance sound-insulation wall which possesses the sound-insulation performance corresponding to the $TL_D$ value equal to or greater than 50. Preferably, the partition wall according to the present invention is so constructed or built as to exhibit the sound-insulation property corresponding to the $TL_D$ value equal to or greater than 58.

From yet another aspect of the invention, the present invention provides a method of sound-insulation of a partition wall for improving a sound-insulation performance of the partition wall to be constructed in a single-runner staggered-stud pattern or a single-runner staggered-pad pattern, wherein the partition wall has a wall end portion butted against another building structure in continuity therewith in a condition that the wall end portion is exposed to architectural spaces at least partially, comprising:

dividing an end post to be located at an end portion of the wall, into first and second end post elements;

spacing said elements from each other to form a gap or an isolation zone for interrupting a propagation of a solid vibration or insulating a path for propagating the solid vibration;

fixing to said first element, an interior finishing panel for defining the architectural space on one side of the wall; and fixing to said second element, the interior finishing panel for defining the architectural space on an opposite side of the wall.

Preferably, the sound-insulating method according to the present invention is embodied in the partition wall exhibiting the sound-insulation performance corresponding to the $TL_D$ value equal to or smaller than 57, whereby the $TL_D$ value is increased up to a value in a range from 58 to 65.

In a preferred embodiment of the present invention, the first and second end post elements are positioned at the wall end portion in a positional relationship such that the elements are shifted relative to each other in a wall core direction, and the gap or the isolating zone extends therebetween in the wall thickness direction. The wall end portion is butted against a vertical surface of the other building structure, such as a column or a wall, in the form of a butt joint. The first element is positioned in close proximity to a surface of an interior finishing material of the other building structure or in contact therewith. The phrase reading "surface of the interior finishing material" includes an unfinished surface of the other building structure or a substrate face of the other building structure to be finished by an interior finishing material, such as a wall cloth or a coat of paint. The second element is positioned in the inside space of the wall and is spaced apart from the first element by the gap or the isolating zone. An air-tight joint structure is interposed between each of the terminal end edges of the interior finishing panels and the interior finishing surface of the other building structure to be in continuity with the panel. In the present specification, the wording "close proximity" means a provision of a space equal to or smaller than 15 mm, preferably, equal to or smaller than 10 mm.

In another preferred embodiment of the present invention, the first and second end post elements are positioned at the wall end portion in parallel with each other, in such a manner that the gap or the isolating zone extends in the wall core direction. The wall end portion is butted against a vertical surface of the other building structure, such as a column or a wall, in the form of a butt joint. The first and second elements are positioned in close proximity to the surface of the interior finishing material of the other building structure or in contact therewith. The phrase reading "surface of the interior finishing material" includes an unfinished surface of the other building structure or a substrate face of the other building structure to be finished by an interior finishing material, such as a wall cloth or a coat of paint.

In a preferred embodiment of the present invention, the partition wall is a dry-type partition wall with a hollow structure constructed with use of steel studs. The structure of this partition wall comprises "steel furrings for wall and ceiling in buildings" (JIS A 6517 standard products, its equivalent, compliant or compatible products, and so forth) and interior finishing panels, such as gypsum boards, securely fixed to the studs by fixing devices or fixing materials, such as screws, staples, and adhesives. The steel furrings include steel studs, steel runners, steady braces, spacers, and so forth. Preferably, each of the first and second elements is substantially the same steel member as the intermediate post of the wall, or a steel member equivalent thereto. For instance, when the intermediate post is a steel stud with a C-shaped cross-section of 65 mm×45 mm and 0.8 mm thickness, each of the first and second elements is also a steel stud with a C-shaped cross-section of 65 mm×45 mm and 0.8 mm thickness. According to such an arrangement, it is enough to prepare only one kind of steel studs for the construction of the wall, and therefore, the numbers of the kinds of construction materials can be reduced and the construction efficiency can be improved.

In the preferred embodiment of the present invention, the interior finishing panel is constituted from a substrate layer board and a surface layer board, wherein the substrate layer board is a gypsum board with a thickness of 20-25 mm (e.g., a reinforced gypsum board with a thickness of 21 mm) and the surface layer board is a gypsum board with a thickness of 8-13 mm (e.g., a gypsum board-hard type with a thickness of 9.5 mm) The boards are securely fixed to each other by a vinyl acetate resin type emulsion adhesive (and staples). In the embodiment of the present invention in which the first and second elements are shifted in the wall core direction relative to each other, the dimensions (L5, L6) of protrusions of the boards, which extend toward the terminal end of the wall from the second element positioned in the inside space of the wall, are set to be equal to or smaller than 100 mm, preferably, equal to or smaller than 85 mm, more preferably, equal to or smaller than 75 mm. In order to limit the dimensions to such values, it is desirable that a size (L2) of the gap (γ) or the isolating zone is limited to a dimension equal to or smaller than 55 mm, preferably, equal to or smaller than 40 mm, more preferably, equal to or smaller than 30 mm. If desired, a buffer material is integrally attached to an outside surface of the first element. An outside surface of the buffer material is in contact with an inside face of the substrate layer board or slightly spaced apart therefrom. The buffer material acts as a backing member for the substrate layer board when the board is deformed inward of the inside space.

Advantageous Effects of Invention

The present invention provides a partition wall structure constructed in the single-runner staggered-stud pattern or the single-runner staggered-pad pattern, and a method for constructing such a partition wall structure, which can improve the sound-insulation performance in the high and middle frequency regions.

Further, the present invention provides a sound-insulation wall constructed in the single-runner staggered-stud pattern or the single-runner staggered-pad pattern, which can possess the sound-insulation performance corresponding to the $TL_D$ value equal to or greater than 58.

BRIEF DESCRIPTION OF DRAWINGS

FIG. 1(A) and FIG. 1(B) are horizontal cross-sectional views, each schematically illustrating a construction of a partition wall according to a preferred embodiment of the present invention.

FIG. 2 is a horizontal cross-sectional view schematically illustrating a construction of the partition wall according to another preferred embodiment of the present invention.

FIG. 3 is a perspective view specifically showing the structure of the wall as shown in FIG. 2.

FIG. 4 is a vertical cross-sectional view specifically showing the structure of the wall as shown in FIG. 2.

FIG. 5 is a horizontal cross-sectional view specifically showing the structure of the wall as shown in FIG. 2.

FIG. 6 is a horizontal cross-sectional view illustrating a different configuration of the wall as shown in FIGS. 3 to 5.

FIG. 7 is a horizontal cross-sectional view schematically illustrating a structure of a conventional lightweight partition wall constructed in the single-runner staggered-stud pattern, as a comparative example.

FIG. 8 is a front elevational view schematically illustrating a specimen of each of Examples 1, 2 and Comparative Examples 1 to 4 built in a skeleton framework for a sound-insulation performance test.

FIG. 9 is a diagram showing measured results of sound reduction performance tests carried out with use of the specimens of Comparative Examples 1 and 2.

FIG. 10 is a diagram showing measured results of sound reduction performance tests carried out with use of the specimens of Comparative Examples 1 and 3.

FIG. 11 is a diagram showing measured results of sound reduction performance tests carried out with use of Comparative Examples 2 and 4.

FIG. 12 is a diagram showing measured results of sound reduction performance tests carried out with use of the specimens of Example 1 and Comparative Example 1.

FIG. 13 is a diagram showing measured results of sound reduction performance tests carried out with use of the specimens of Example 2 and Comparative Example 2.

FIG. 14 is a horizontal cross-sectional view of a wall end portion showing a first modified embodiment of the present invention.

FIG. 15 is a horizontal cross-sectional view of the wall end portion showing a second modified embodiment of the present invention.

FIG. 16 is a horizontal cross-sectional view of the wall end portion showing a third modified embodiment of the present invention.

FIG. 17 is a horizontal cross-sectional view of the wall end portion showing a fourth modified embodiment of the present invention.

FIG. 18 is a horizontal cross-sectional view of the wall end portion showing a fifth modified embodiment of the present invention.

FIG. 19 is a horizontal cross-sectional view of the wall end portion showing a sixth modified embodiment of the present invention.

FIG. 20(A) and FIG. 20(B) are horizontal cross-sectional views schematically illustrating the conventional structures of partition walls constructed in the single-runner common-stud pattern and the single-runner staggered-pad pattern, respectively.

FIG. 21(A) and FIG. 21(B) are horizontal cross-sectional views schematically illustrating the conventional structures of partition walls constructed in a double-runners parallel-studs pattern and the single-runner staggered-stud pattern, respectively.

DESCRIPTION OF EMBODIMENT

With reference to the attached drawings, preferred embodiments of the present invention are described in detail hereinafter.

FIG. 1(A) and FIG. 1(B) are horizontal cross-sectional views, each schematically illustrating a construction of a partition wall according to a preferred embodiment of the present invention.

A partition wall 1 as shown in each of FIG. 1(A) and FIG. 1(B) is a lightweight partition wall constructed in a single-runner staggered-stud pattern. An end portion 1a of the wall 1 is butted against a wall surface Wa of a wall W (or a vertical surface Ca of a column C). The wall 1 extends along its wall centerline X-X. On both sides of the wall 1, architectural spaces R1, R2, such as inhabitant rooms, are comparted. Studs 4, which functions as intermediate posts or pillars, are arranged in a staggered formation with spacers 9 installed alternately, in such a manner that the studs 4 are decentered with respect to the centerline X-X, alternately on either one side of the centerline X-X. The spacer 9 is a conventional metal product which is usually called as a "runner spacer" or the like. For example, "C" shaped steel stud with the width $\omega_1$ equal to 65 mm is used as the stud 4; a prefabricated runner spacer with the width $\omega_4$ equal to 10 mm is used as the spacer 9; a gypsum board with a thickness of 21 mm and a gypsum board with a thickness of 9.5 mm are used as a substrate layer board 5 and a surface layer board 6 respectively; and steel runners, each having the width $\omega_3$ equal to 75 mm, are used as a lower runner 2 and an upper runner (not shown). The wall thickness $\omega_2$ of the wall 1 is set to be approximately 135 mm. If desired, a spacer made of an arbitrary material, such as a piece of gypsum board, wooden material or resin material, may be employed as the spacer 9.

At an end portion 1a of the wall 1 as shown in FIG. 1(A), a pair of end post elements 11, 12 are located in symmetry with respect to the wall centerline X-X. As the element 11, 12, a steel stud with an arbitrary cross-section, such as a steel stud having a square, rectangular, or "C" shaped cross-section, may be used. A small gap β with a gap dimension of approximately 10 mm is formed between the elements 11, 12, which are spaced apart from each other in a direction perpendicular to the centerline X-X (referred to as "wall thickness direction" hereinafter). The gap β extends in a direction of the wall centerline X-X (referred to as "wall core direction" hereinafter) and extends over the whole height of the elements 11, 12. The elements 11, 12 constitute a composed end post 10. The end post 10 is a building component corresponding to an end stud, a vertical runner, an end runner, or the like which has been conventionally installed at the wall end portion 1a. In this specification, the "end post" means a post, pillar or columnar member which is positioned at a terminal end in an array of studs constituting the partition wall and which is positioned in the close vicinity to or in contact with the other building structure in continuity with the partition wall, such as another wall or a column.

On the other hand, the partition wall 1 as shown in FIG. 1(B) is provided with the end post elements 13, 14 at the end portion 1a, wherein the elements 13, 14 are located at positions shifted to each other in the wall thickness direction and the wall core direction. The elements 13, 14 are spaced apart from each other at a small distance of approximately 10 mm. A gap γ is formed between the elements 13, 14. The gap γ extends in the wall thickness direction and extends over the whole height of the elements 13, 14. As the element 13, 14, a steel stud with arbitrary cross-section, such as a square or rectangular cross-section, or a "C" shaped cross-section, may be used.

In each of the walls 1 as shown in FIGS. 1(A) and 1(B), the boards 5, 6 forming an interior wall surface of the architectural space R1 are fixed to the elements 12, 14 eccentric on the side of the space R1 with respect to the centerline X-X, whereas the boards 5, 6 forming the interior wall surface of the architectural space R2 is fixed to the elements 11, 13 eccentric on the side of the space R2 with respect to the centerline X-X. The noise Si (indicated by a solid arrow), which is caused in the space R1, propagates to the elements 12, 14 as the solid propagation sound. However, the propagation of the solid vibration is interrupted or insulated by the gap β between the elements 11, 12 or the gap γ between the elements 13, 14. Thus, the solid vibration propagating through the upper and lower runners and so forth is merely transferred to the space R2 as a solid propagation sound So (indicated by a dotted or dashed arrow). Therefore, a phenomenon of deterioration of the sound-insulation property can be prevented from occurring in relation to the structure of the end portion 1a. This phenomenon will be described later.

FIG. 2 is a horizontal cross-sectional view schematically illustrating another preferred embodiment of the construction of the partition wall according to the present invention.

The partition wall 1 as shown in FIG. 2 has end post elements 15, 16 located at positions shifted to each other in the wall thickness direction and the wall core direction, similarly to the wall 1 shown in FIG. 1(B). The elements 15, 16 are the steel studs which are the same as the studs 4. The elements 15, 16 are erected between the lower runner 2 and the upper runner (not shown) with the use of spacers 19 and supported by the lower and upper runners, similarly to the stud 4. The spacers 19 are prefabricated products which are the same as the spacers 9.

The elements 15, 16 are spaced apart from each other at a small distance of approximately 10 mm. A gap γ is formed between the elements 15, 16. The gap γ extends in the wall thickness direction and extends over the whole height of the elements 15, 16. The noise Si, which is caused in the space R1, propagates to the element 16 as the solid propagation sound. However, the propagation of the solid vibration is interrupted or insulated by the gap γ between the elements 15, 16. Thus, the solid vibration propagating through the upper and lower runners and so forth is merely transferred to the space R2 as the solid propagation sound So. Therefore, the phenomenon of deterioration of the sound-insulation property can be prevented from occurring in relation to the structure of the end portion 1a. This phenomenon will be described later.

FIGS. 3-5 are a perspective view, a vertical cross-sectional view, and a horizontal cross-sectional view, respectively, which specifically illustrate the partition wall structure as shown in FIG. 2.

As shown in FIG. 3, the partition wall 1 is a lightweight partition wall built by a dry-type construction method (a partition wall with the steel furrings (JASS 26)), which is constructed in an indoor space of a reinforced concrete building. A structural framework of the building comprises floor structures F1, F2, columns C, beams B, and walls W. A lower end portion of the partition wall 1 is supported or carried by the floor structure F1. An upper end portion of the wall 1 joins with the beam B or the floor structure F2. A terminal end portion of the wall 1 as seen in the wall core direction, i.e., the wall end portion 1a is in continuity with the column C or the wall W in the form of a butt joint. In this specification, the wall end portion 1a is a part of the wall existing in a range of a distance L3 (FIG. 5) measured from the wall surface Wa or the vertical surface Ca. As regards the wall 1 shown in FIGS. 3 to 5, the distance L3 is set to be a dimension equal to or smaller than 200 mm, e.g., approximately 150 mm.

A plastering material Bc, Cc (FIG. 5), Wc (FIG. 5), such as cement mortar, has been troweled on each of interior surfaces of the beam B, the column C, and the wall W. The lower and side surfaces Ba, Bd of the beam B, the vertical surfaces Ca of the column C, and the wall surfaces Wa of the wall W are troweled surfaces, which are substrate faces to be finished by interior finishing materials, such as a coat of paint, a sheet of wall cloth and so forth. A selection of the type of the building structure, a selection of execution or omission of the plastering or interior finishing work, a selection of the interior finishing material, and so forth, are arbitrary matters of architectural design. For instance, each of the lower surface Ba, the side surface Bd, the vertical surface Ca, and the wall surface Wa may be a surface of a steel frame, a surface of a reinforced concrete structure, a surface of PC panel, a surface of wooden material, or the like.

In the present embodiment, the lower end portion of the wall 1 is supported by the floor structure F1 at a level of the story where the wall 1 is constructed, the upper end portion of the wall 1 is fixed to the beam B of the upper floor, and the end portion 1a of the wall 1 is in continuity with the column C. The upper end portion of the wall 1 may be fixed to a concrete floor slab or the like which constitutes the structure F2 of the upper floor. The end portion 1a of the wall 1 may be in continuity with the wall structure W.

A filler for joints of four peripheral edges 20 (referred to as "joint material 20" hereinafter), which constitutes the joint structure of each of the four peripheral edges, is charged or inserted in joint sections (joining portions) at the upper, lower and terminal end portions of the wall 1. The joint material 20 comprises backing-layer sealing materials 21, 22 and a surface-layer sealing material 23 (FIGS. 4 and 5). In this embodiment, an inorganic sealant, for example, a rockwool felt (e.g., "Tiger Rock Felt" (trademark), a product of Yoshino Gypsum Co., Ltd.) is used as the sealing material 21, and a urethane resin sealant or the like (e.g., "Tiger U Tight" (trademark), a product of Yoshino Gypsum Co., Ltd.) is used as the sealing materials 22, 23.

As methods for joint treatment of the joints along four peripheral edges, the following joint treatment materials or joint treatment methods are exemplified:
(1) Joint Treatment Method-1
Backing-Layer Joint Treatment: a rockwool felt ("Tiger Rock Felt" (product name)), an inorganic sealant ("Tiger Gyptight" (product name)), or a urethane resin sealant ("Tiger U Tight" (product name))
Surface-Layer Joint Treatment: an inorganic sealant ("Tiger Gyptight" (product name)), or a urethane resin sealant ("Tiger U Tight" (product name))
(2) Joint Treatment Method-2
Backing-Layer Joint Treatment: a rockwool felt ("Tiger Rock Felt" (product name)) and a urethane resin sealant ("Tiger U Tight" (product name))
Surface-Layer Joint Treatment: an inorganic sealant ("Tiger Gyptight" (product name)) or a urethane resin sealant ("Tiger U Tight" (product name))

As shown in FIGS. 3-5, the wall surface of the board 6 of the wall 1 is finished by an interior finishing work, such as a painting or cloth-finishing work, so that the wall surface is coated or covered by the interior finishing material (such as a paint coating or cloth) 8. The interior finishing material 8 is also applied to or installed on the surfaces Ba, Bd, Ca, Wa of the beam B, column C and wall W. Therefore, the interior finishing material 8 extends continuously on the substantially whole surface of the beam B, column C and wall W, and the surfaces Ba, Bb, Ca, Wa define the indoor or interior surface of the building.

As shown in FIGS. 4 and 5, the wall 1 comprises the lower runner 2 fixed on the floor structure F1, such as a floor slab, the upper runner 3 fixed to the lower surface Ba of the beam B, and a number of the studs 4 are vertically installed between the runners 2, 3. Each of the studs 4 is a steel stud of the light gauge steel (JIS A 6517 standard products, its equivalent, compliant or compatible products, and so forth). The studs 4 are arranged in a staggered formation along the wall centerline. The width ω1 of the stud 4 is smaller than the width ω3 of the runner 2, 3. The metal spacer 9 with the width ω4 is interposed between the side wall of the runner 2, 3 and the side surface of the stud 4.

The substrate layer board 5 is fixed to the studs 4 by screws (tapping screws) 30. The surface layer board 6 is fixed onto the outside surface of the board 5 by staples and an adhesive (not shown). As the adhesive, a vinyl acetate resin type emulsion adhesive, which is generally used as an adhesive for adhering gypsum boards together, is preferably employed. If desired, all of the staples, adhesive and screws may be simultaneously used for overlaying the board 6 on the board 5, or the board 6 may be overlaid on the board 5 only by the screws. A concealed space, which is substantially confined in the wall, is formed between the boards 5 on both sides of the wall, as the inside area or inside space α. A thermal-insulating and sound-absorbing material 40 (shown by dotted lines) is provided in the inside area. The material 40 is charged or inserted in the spaces between the studs 4, as shown in FIG. 5.

As the members constituting the wall 1, the following materials, which are generally used for building construction works, are exemplified:
Lower runner 2: Light gauge steel material (steel runner), C-shaped cross-section of 75 mm×40 mm, 0.8 mm thickness
Upper runner 3: Light gauge steel material (steel runner), C-shaped cross-section of 75 mm×40 mm, 0.8 mm thickness
Stud 4: Light gauge steel material (steel stud), C-shaped cross-section of 65 mm×45 mm, 0.8 mm thickness
Substrate layer board 5: Reinforced gypsum board, thickness T1 of 21 mm ("Tiger Board-Type Z" manufactured by Yoshino Gypsum Co., Ltd.)
Surface layer board 6: Gypsum board-hard type, thickness T2 of 9.5 mm ("Tiger Super Hard" manufactured by Yoshino Gypsum Co., Ltd.)
Thermal-insulating and sound-absorbing material 40: Glass wool, 24 kg/m$^3$, 50 mm thickness Each of "Tiger Board" and "and Tiger Super Hard" is a registered trademark of Yoshino Gypsum Co., Ltd.

Various kinds of gypsum boards with thicknesses in a range from 8 mm to 25 mm may be preferably used as the boards 5, 6. If desired, a light gauge steel material (steel runner) with a C-shaped cross-section of 100 mm×40 mm and 0.8 mm thickness may be employed as each of the runners 2, 3. As the stud 4, a metal stud with arbitrary cross-section, thickness, and dimensions may be employed. For example, a C-shaped steel stud with one of the various sizes, such as 45, 50, 65, 75, 90 or 100 mm in width, or a metal stud with one of the various thicknesses, such as 0.4, 0.5, 0.6 mm in thickness (practically used product), or 0.8 mm in thickness (JIS Product), may be employed as the stud 4. In addition, the thickness of the thermal-insulating and sound-absorbing material 40 may be set to be one of the various thicknesses, such as 25, 40, 50, 70 or 100 mm, or an arbitrary density, such as 16, 24, 32, 40 or 48 kg/m$^3$ may be employed as the density of the material 40.

As shown in FIG. 4, the upper end portion of the wall 1 is butted against the lower surface Ba of the beam B. The upper runner 3 positioned at the upper end portion of the wall 1 is securely fixed to the surface Ba by fastening elements, such as anchoring elements (not shown). Also, in a case where the upper end portion of the wall is to be butted against a lower surface of the floor structure F2, substantially the same fixing structure is employed.

As shown in FIG. 5, the wall end portion 1a of the wall 1 is butted against the vertical surface Ca of the reinforced concrete column C, which constitutes the structural framework of the building. As shown by the reference signs in parenthesis in FIG. 5, in a case where the end portion of the wall 1 is butted against the wall surface Wa of the wall W, substantially the same junction structure is employed.

As shown in FIG. 5, the end post elements 15, 16 in a pair are located in a positionally offset relation with respect to each other in the wall core direction. The elements 15, 16 constitute a composite end post 10. The element 15, 16 is a light gauge steel material (steel stud) with a C-shaped cross-section of 65 mm×45 mm and 0.8 mm thickness. The elements 15, 16 are erected between the runners 2, 3 with use of the spacers 19 and are supported by the runners 2, 3, similarly to the studs 4. As shown in FIG. 5, the elements 15, 16 are spaced apart from each other, at a distance L2. A gap γ is created between the elements 15, 16.

The board 5 on the side of the space R1 is securely fixed by the screws 30, to the element 16 and the studs 4 decentered on the side of the space R1. The board 5 on the side of the space R2 is securely fixed by the screws 30, to the elements 15 and the studs 4 decentered on the side of the space R2. The board 6 is fixed onto the board 5 by the staples or the vinyl acetate resin type emulsion adhesive (not shown), as set forth above. The element 15 supports edge portions of the boards 5, 6 on the side of the space R2 in a relatively stable condition. On the other hand, the edge portions of the boards 5, 6 on the side of the space R1 protrude from the element 16 toward the vertical surface Ca (or the wall surface Wa). Therefore, stability, rigidity, or durability of the supporting structure of the boards 5, 6 should be taken into consideration. For such a reason, dimensions L5, L6 of protrusions of the boards 5, 6, which extend from the element 16 toward the terminal end of the wall, are set to be, preferably, equal to or smaller than 100 mm, more preferably, equal to or smaller than 75 mm. In order to limit the dimensions to such values, it is desirable that the size L2 of the gap γ is limited to a dimension equal to or smaller than 55 mm, preferably, equal to or smaller than 30 mm.

FIG. 6 is a horizontal cross-sectional view showing another configuration of the wall 1. The wall 1 as shown in FIG. 6 joins with a lightweight partition wall 1' in the form of a butt joint. The wall 1 is constructed in a single-runner staggered-stud pattern. The wall 1' extends in a direction perpendicular to the wall 1. The wall 1' has substantially the same construction as the wall 1. The wall end portion 1a of the wall 1 is in continuity with the surface layer board 6 of the wall 1' with the joint material 20 interposed therebetween. The end post element 15 is in close proximity to the board 6 of the wall 1' or in contact therewith.

FIG. 7 is a horizontal cross-sectional view showing a comparative example of the partition wall. In FIG. 7, a conventional lightweight partition wall 100 constructed in the single-runner staggered-stud pattern as shown in FIG. 21(B) is more specifically illustrated. The wall end portion 100a of the wall 100 is in continuity with the column C or the wall W in the form of a butt joint. The terminal end edges or boundary edges of the boards 5, 6 are positioned at the wall end portion 100a of the wall 100. Therefore, a stability of the supporting structure, the construction workability, and so forth should be taken into consideration. Thus, the steel stud with a C-shaped cross-section having the width ω3 (a C-shaped cross-section of 75 mm×45 mm and 0.8 mm thickness) is erected as the end post 7, at the wall end portion 100a. The width ω3 is substantially equal or equivalent to the width of the runner 2.

The present inventor et al. have prepared specimens of the wall 1 according to the aforementioned embodiment (FIGS. 3 to 5) as Examples 1 and 2 and specimens of the wall 100 with the conventional construction (FIG. 7) as Comparative Examples 1 to 4. The present inventor et al. have carried out sound-insulation testing with respect to the sound-insulation performance of each of these specimens. In each of Examples 1, 2 and Comparative Examples 1 to 4, the width ω3 of each of the upper and lower runners 2, 3 has been set to be 100 mm.

The common testing conditions with respect to the walls 1, 100 of Examples 1, 2 and Comparative Examples 1 to 4 are as follows:

Runners 2, 3: Light gauge steel material (steel runner), C-shaped cross-section of 100 mm×40 mm, 0.8 mm thickness Stud 4: Light gauge steel material (steel stud), C-shaped cross-section of 65 mm×45 mm, 0.8 mm thickness Substrate layer board 5: Reinforced gypsum board, thickness T1 of 21 mm ("Tiger Board-Type Z" manufactured by Yoshino Gypsum Co., Ltd.)

Substrate layer board 6: Gypsum board-hard type, thickness T2 of 9.5 mm ("Tiger Super Hard" manufactured by Yoshino Gypsum Co., Ltd.)

Each of "Tiger Board" and "Tiger Super Hard" is a registered trademark of Yoshino Gypsum Co., Ltd.

In Comparative Examples 1 to 4, the end post 7 is a light gauge steel material (steel stud) with a C-shaped cross-section of 100 mm×45 mm and 0.8 mm in thickness. In Examples 1 and 2, each of the end post elements 15, 16 is a light gauge steel material (steel stud) with a C-shaped cross-section of 65 mm×45 mm and 0.8 mm in thickness, which is the same material as the stud 4.

The dimensions ω1, ω2, ω3, ω4 of the walls 1, 100 of Examples 1, 2 and Comparative Examples 1 to 4 are set to be 65 mm, 161 mm, 100 mm, 35 mm, respectively. In the walls 1, 100 of Examples 1, 2 and Comparative Examples 1 to 4, the boards 5 are securely fixed to the studs 4, the posts 7 and the elements 15, 16 by the screws (tapping screws) 30.

In the walls 1, 100 of Examples 1, 2 and Comparative Examples 1 to 3, the boards 6 are securely fixed onto the outside surface of the boards 5 by the staples and the vinyl acetate resin type emulsion adhesive.

Examples 1, 2 differ only in the following points:
(1) In Example 1, a single glass wool mat with the density of 24 kg/m³ and the thickness of 50 mm is charged or inserted in the inside space α as the thermal-insulating and sound-absorbing material 40; and
(2) In Example 2, double glass wool mats, each having the density of 24 kg/m³ and the thickness of 50 mm, are charged or inserted in the inside space α as the thermal-insulating and sound-absorbing material 40.

Therefore, it is possible to compare the difference in the sound-insulation property which derives from the difference in the thickness of the material 40, on the basis of the testing of the specimens of Examples 1, 2. In each of Examples 1, 2, the dimension of the gap γ is set to be approximately 10 mm.

Comparative Examples 1 to 4 differ in the following points:
(1) In Comparative Example 1, a single glass wool mat with the density of 24 kg/m³ and the thickness of 50 mm is charged or inserted in the inside space α as the thermal-insulating and sound-absorbing material 40;

(2) In Comparative Example 2, double glass wool mats, each having the density of 24 kg/m³ and the thickness of 50 mm, are charged or inserted in the inside space α as the thermal-insulating and sound-absorbing material 40;

(3) In Comparative Example 3, a glass wool mat with the density of 32 kg/m³ and the thickness of 50 mm and a glass wool mat with the density of 32 kg/m³ and the thickness of 25 mm is charged or inserted in the inside space α as the thermal-insulating and sound-absorbing material 40; and (4) In Comparative Example 4, double glass wool mats, each having the density of 24 kg/m³ and the thickness of 50 mm, are charged or inserted in the inside space α as the thermal-insulating and sound-absorbing material 40, and the boards 6 are securely fixed on the outside surface of the boards 5 by staples and a vibration-damping adhesive.

On the basis of the testing of the specimens of Comparative Examples 1 to 4, it is possible to compare the difference among the sound-insulation properties, in relation to the difference in the density and the thickness of the material 40, and in relation to the difference between the adhesives for adhering the board 6 onto the board 5. As the vibration-damping adhesive, "Sound Cut" (trademark) manufactured by Yoshino Gypsum Co., Ltd. is employed, which exhibits a relatively effective vibration-damping performance in a high frequency region.

In Example 1, 2, the end post 10 has a two-part structure composed of the elements 15, 16, in accordance with the present invention. On the other hand, Comparative Examples 1 and 2 has the conventional structure with the end post constituted from the single stud 7. Example 1, 2 and Comparative Example 1, 2 differ only in these constructions. Therefore, the advantageous effects of the present invention superior to the conventional structure are understandable from a comparison between the sound-insulation performances of Example 1 and Comparative Example 1 (FIG. 12), or a comparison between the sound-insulation performances of Example 2 and Comparative Example 2 (FIG. 13).

FIG. 8 is a front elevational view illustrating a specimen of each of Examples 1, 2 and Comparative Examples 1 to 4 built in a skeleton structure for a sound-insulation performance test. FIGS. 9 to 13 are diagrams, each showing the measured results of the sound-insulation performance tests. In FIGS. 9 to 13, reference curves of $TL_D$ (D-Number of Sound Transmission Loss) are represented by thin broken lines, which indicate the $TL_D$ values equal to 40, 45, 50, 55, 60, respectively. These reference curves are the reference curves of the sound-insulation performances standardized by the Architectural Institute of Japan. Although the values of $TL_D$ can be obtained in units of one decibel essentially, the reference curves are represented in units of five decibels in FIGS. 9 to 13 for simplification of the diagrams. However, it should be understood that four reference curves actually exist between the reference curves depicted in FIGS. 9 to 13. In each of FIGS. 9 to 13, dots are plotted, which indicates the measured results obtained by the sound-insulation performance tests. The uppermost reference curve located under all of the plotted dots is specified as the reference curve representing the sound-insulation performance of the tested partition wall. The $TL_D$ value indicated by the curve thus specified is the $TL_D$ value of the tested partition wall.

In the sound-insulation performance tests, the specimen of the partition wall 1 has been built in the rectangular opening of the skeleton structure E made of the reinforced concrete, as shown in FIG. 8. The upper and lower end portions η of the specimen have been connected to the structure E with a connecting structure which simulates the connecting structure including the runners 2, 3 as shown in FIG. 4. The wall end portions δ of the specimen have been connected to the structure E with a connecting structure which simulates the connecting structure of the wall end portion 1a, 100a including the end posts 10 or the studs 7.

In FIG. 9, there are shown the measured results of the sound-insulation performance tests of the walls 100 of Comparative Examples 1 and 2. The difference in the sound-insulation performance, which results from the difference in the thickness of the thermal-insulating and sound-absorbing material 40, is understandable from the measured results as shown in FIG. 9. As is apparent from the measured results shown in FIG. 9, if the thickness of the material 40 is doubled in the wall 100 with the conventional structure, the sound-insulation performance is improved in a frequency region ranging from 125 Hz to 500 Hz, but the sound-insulation performance is not improved in a frequency region ranging from 1000 Hz to 2000 Hz. Therefore, the value $TL_D$ of the sound-insulation performance is equal to 57 with respect to each of the walls 100 of Comparative Examples 1 and 2.

In FIG. 10, there are shown the measured results of the sound-insulation performance tests of the walls 100 of Comparative Examples 1 and 3. The difference in the sound-insulation performance, which results from the difference in the thickness and density of the material 40, is understandable from the measured results as shown in FIG. 10. As is apparent from the measured results shown in FIG. 10, if the thickness and density of the material 40 are increased by 1.5 times and 1.3 times with respect to the wall 100 having the conventional structure, the sound-insulation performance is improved in the frequency region ranging from 125 Hz to 500 Hz. However, the sound-insulation performance is not improved in a frequency region ranging from 1000 Hz to 2000 Hz. Thus, although the value $TL_D$ of the sound-insulation performance is equal to 57 with respect to the wall 100 of Comparative Example 1, the value $TL_D$ of the sound-insulation performance is rather decreased down to 56 with respect to the wall 100 of Comparative Example 3.

In FIG. 11, there are shown the measured results of the sound-insulation performance tests of the walls 100 of Comparative Examples 2 and 4. In Comparative Example 4, the vibration-damping adhesive is used as the adhesive for adhering the boards 5, 6 together, as set forth above. The difference in the sound-insulation performance, which results from the use or unuse of the vibration-damping adhesive, is understandable from the measured results as shown in FIG. 11. As is apparent from the measured results shown in FIG. 11, even if the vibration-damping adhesive is used, the sound-insulation performance of the wall 100 with the conventional structure is not improved in a frequency equal to or lower than 2000 Hz, although the sound-insulation performance is significantly improved in a frequency of 4000 Hz. Thus, the value $TL_D$ of the sound-insulation performance is equal to 57 with respect to each of the walls 100 of Comparative Examples 2 and 4.

As is understandable from the measured results as shown in FIGS. 9 to 11, even if the thickness and density of the material 40 are increased for improvement of the sound-insulation performance of the wall 100 or the relatively special adhesive taking the specific vibration-damping effect is used as the adhesive for adhering the boards 5, 6 together for the same purpose, the sound-insulation performance cannot be desirably improved, especially in a frequency region ranging from 500 to 2000 Hz, and therefore, the value $TL_D$ of the sound-insulation performance is still equal or equivalent to the value of the conventional partition wall.

In FIG. 12, there are shown the measured results of the sound-insulation performance tests of the walls 100, 1 of Comparative Example 1 and Example 1. As set forth above, the difference between Example 1 and Comparative Example 1 is that, in Example 1, the two-part structure of the end post 10 is embodied as the elements 15, 16 in accordance with the present invention, whereas in Comparative Example, the end post is the single steel stud 7 as is conventional. Therefore, the advantageous effect of the present invention over the prior art can be understood by comparison between the sound-insulation performances of Example 1 and Comparative Example 1.

As is apparent from the measured results of the sound-insulation performance tests as shown in FIG. 12, the sound-insulation performance is improved over a wide frequency region ranging from 250 Hz to 4000 Hz, in the wall 1 of Example 1. Especially, the sound-insulation performance in the frequency region ranging from 500 Hz to 2000 Hz is significantly improved in the wall 1 of Example 1 as is apparent from the measured results shown in FIG. 12, whereas such improvement of the sound-insulation performance cannot be observed in the measured results shown in FIGS. 9 to 11. The value $TL_D$ of the sound-insulation performance of the wall 100 (Comparative Example 1) is equal to 57, whereas the value $TL_D$ of the sound-insulation performance of the wall 1 (Example 1) is improved to be 58.

In FIG. 13, there are shown the measured results obtained in the sound-insulation performance test with respect to the walls 100, 1 of Comparative Example 2 and Example 2. As set forth above, in the Example, the end post 10 has the two-part structure (the elements 15, 16) in accordance with the present invention, whereas in the Comparative Example, the end post is formed by the single steel stud 7 as is conventional. Therefore, the advantages of the present invention over the prior art can be also understood by comparison between the sound-insulation performances of Example 2 and Comparative Example 2.

As is apparent from the measured results of the sound-insulation performance test as shown in FIG. 13, the sound-insulation performance is improved over a wide frequency region ranging from 250 Hz to 4000 Hz, in the wall 1 of Example 2. In particular, similar to the measured results as shown in FIG. 12, the sound-insulation performance in the frequency region ranging from 500 Hz to 2000 Hz is significantly improved in the wall 1 of Example 2, as is apparent from the measured results shown in FIG. 13. Thus, the value $TL_D$ of the sound-insulation performance of the wall 1 (Example 2) is increased up to 61. This is a remarkable improvement, in comparison to the sound-insulation performance of the wall 100 (Comparative Example 2), the value $TL_D$ of which is equal to 57.

As far as the measured results in FIGS. 9 to 13 is concerned, it is apparent that the sound-insulation performance of the conventional wall 100 of each of Comparative Examples 1 to 4 has not been able to be improved, owing to the conventional structure of the wall end portion 100a with the single end post structure of the steel stud 7. On the other hand, according to the present invention, the sound-insulation performance of the partition wall 1 can be improved as a whole by the adoption of the configuration of the wall end portion with the end post 10 having the two-part structure (the elements 15, 16).

As described above, even if the thickness or density of the thermal-insulating and sound-absorbing material 40, such as glass wool, inserted hi the inside space of the wall 100 is changed, or the special adhesive, such as the vibration-damping adhesive, is used as the adhesive for adhering the boards 5, 6 together, the value $TL_D$ of the sound-insulation performance is substantially equal to or only slightly increased, and therefore, the sound-insulation performance cannot be improved significantly. On the other hand, according to the present invention, the end post 10 of the partition wall 1 is divided into the plural elements 15, 16 and the elements 15, 16 are spaced apart from each other by the gap γ, whereby the sound-insulation performance can be improved significantly, especially in the middle and high frequency region (the frequency region ranging, from 250 Hz to 4000 Hz), so as to substantially increase the $TL_D$ value of the sound-insulation performance.

Further, in construction of the conventional partition wall 100, it is necessary to prepare two kinds of steel studs, i.e., not only the C-shaped cross-section of 65 mm×45 mm and the thickness of 0.8 mm as the studs 4, but also the C-shaped cross-section of 100 mm×45 mm and the thickness of 0.8 mm as the end post 7. On the other hand, each of the elements 15, 16 of the partition wall 1 can be the same steel stud as the stud 4, i.e., the light gauge steel studs with the C-shaped cross-section of 65 mm×45 mm and the thickness of 0.8 mm. Also, the spacer 19 can be the same prefabricated product as the spacer 9. Thus, for the construction of the wall 1, it is enough to prepare only one kind of steel studs, and therefore, the number of the kinds of the construction materials can be reduced and the construction efficiency can be improved.

Each of FIGS. 14 to 19 is a horizontal cross-sectional view of the wall end portion 1a, in which a modification of the partition wall 1 is illustrated. In each of FIGS. 14 to 19, the constituent element or member substantially the same as the constituent element or member in the embodiment as shown in FIGS. 4 and 5 or equivalent thereto is indicated by the same reference numeral.

In the partition wall 1 as shown in FIG. 14, buffer materials 51, 52, such as rock wool felts or resin forms, are provided at the wall end portion 1a. The buffer material 51 is a sheet-like member interposed between the surface Wa, Ca of the wall or column W, C and the web part 15a of the end post element 15. The buffer material 51 prevents the solid vibration from propagating between the element 15 and the wall or column W, C. The thickness of the buffer material 51 is set to be, e.g., 10 mm, and the width of the buffer material 51 is set to be, e.g., equal to or equivalent to the width of the element 15 or the width of the inside space α. The buffer material 51 is attached to the web part 15a throughout the overall height of the element 15, or partially attached to the web part 15a, vertically spaced apart from each other.

The buffer material 52 has a relatively thick strip-like configuration. The buffer material 52 is integrally attached onto an outside surface of a flange part 15b of the element 15 to extend throughout the approximately overall height of the element 15. A surface of the buffer material 52 is in close proximity to the substrate layer board 5. The thickness of the buffer material 52 is set to be, e.g., 10 mm and the width of the buffer material 52 is set to be, e.g., a dimension ranging from 10 mm to 30 mm. An outside surface of the buffer material 52 is in contact with an inside surface of the board 5 or slightly spaced apart therefrom. For instance, when an external force P acts on the wall surface of the wall end portion 1a to deform the boards 5, 6 inward, the buffer material 52 acts as a backing member for the boards 5, 6 so as to prevent the panels from being deformed excessively. As each of the buffer members 51, 52, a fibrous material, soft resin, rubber, elastomer, porous foam, and so forth, which has a vibration-insulating property, may be preferably employed.

In the partition wall 1 as shown in FIG. 15, the end post elements 15, 16 positioned on the wall end portion 1*a* have different cross-sectional dimensions. For instance, the width ω5 of the element 15 is greater than the width ω1 of the stud 4 as shown in FIG. 5, whereas the width ω6 of the element 16 is smaller than the width ω1 of the stud 4 as shown in FIG. 5.

According to the structure of the end portion of the wall 1 as shown in FIGS. 14 and 15, the gap γ is formed between the end post elements 15, 16, and the gap γ extends in the direction of the wall thickness, similarly to the aforementioned embodiment. If desired, a thermal-insulating and sound-absorbing material 41 (shown by dotted lines) analogous to the thermal-insulating and sound-absorbing material 40 may be inserted between the elements 15, 16, so that an isolation zone partially occupying the gap γ is formed by the material 41.

The partition wall 1 as shown in FIG. 16 has the wall structure as shown in FIG. 1(A), and the end post elements 11, 12, each having a hollow and square cross-section, are arranged in parallel at the wall end portion 1*a* to configure the end post 10. The elements 11, 12 are symmetrically positioned with respect to the wall centerline X-X, and a whole cross-section of the elements 11, 12 is symmetric with respect to the wall centerline X-X. A gap β with a dimension T3 is formed between the elements 11, 12. The dimension T3 is set to be, e.g., approximately 10 mm. A steel stud with a square or rectangular cross-section is preferably adopted as the element 11, 12.

According to the structure of the end portion of the wall 1 as shown in FIG. 16, the gap β extending in the wall core direction is formed between the elements 11, 12. If desired, a fibrous material, soft resin, rubber, elastomer, porous foam, and so forth, which has a vibration-insulating property, is interposed between the elements 11, 12, as an isolation zone 42 (shown by dotted lines).

The partition wall 1 as shown in FIG. 17 has the wall structure as shown in FIG. 1(B), and the end post elements 13, 14, each having a hollow and rectangular cross-section, are provided at the wall end portion 1*a* to configure the end post 10. A cross-section of each of the elements 13, 14 has a weak axis (a major axis) oriented in the wall thickness direction and a strong axis (a minor axis) oriented in the wall core direction, similarly to the stud 4. The gap γ with a dimension L2 is formed between the elements 13, 14. The dimension L2 is set to be, e.g., approximately 30 mm. A steel stud with a square or rectangular cross-section is preferably adopted as each of these elements.

According to the structure of the end portion of the wall 1 as shown in FIG. 17, the gap γ extending in the wall thickness direction is formed between the elements 13, 14, similarly to the aforementioned embodiments. If desired, a fibrous material, soft resin, rubber, elastomer, porous foam, and so forth, which has a vibration-insulating property, is interposed between the elements 13, 14, as the isolation zone 42 (shown by dotted lines).

The partition wall 1 as shown in each of FIGS. 18(A) and 18(B) has an arrangement in which steel stud members, each having a rectangular cross-section, are used as the end post elements and the studs 4'. Each of the stud members has a weak axis (a major axis) oriented in the wall core direction and a strong axis (a minor axis) oriented in the wall thickness direction. The gap β with a dimension T3 is formed between the elements 11, 12 as shown in FIG. 18(A), similarly to the wall structure as shown in FIG. 1(A). The gap γ with a dimension L2 is formed between the elements 13, 14 as shown in FIG. 18(B), similarly to the wall structure as shown in FIG. 1(B).

The partition wall 1 as shown in FIG. 19(A) has a partition wall structure, which is constructed in the single-runner staggered-stud pattern as shown in FIGS. 2 to 5 and which is additionally provided with the backing pads 4*a* in a staggered formation, each being interposed between the studs 4 and the substrate layer boards 5. Further, the partition wall 1 as shown in FIG. 19(B) has a structure similar to the partition wall structure constructed in the single-runner staggered-pad pattern as shown in FIG. 20(B), wherein the backing pads 4*a* is located in a staggered formation, each being interposed between the stud 4 and the board 5, and wherein gaps 4*b* are created between the studs 4 and the boards 5 in an alternate formation. Similarly to the wall structures as shown in FIG. 1(B) to FIG. 5, the end post elements 15, 16 in a pair are positioned at the wall end portion 1*a* to configure the end post 10, and the gap γ is formed between the elements 15, 16. The dimension L2 of the gap γ is set to be equal to or smaller than 55 mm, preferably, equal to or smaller than 30 mm (e.g., 10 mm).

As a further modification, the structure of the present invention may be applied to a partition wall with a wooden structure, which has woody or wooden studs. For example, the partition wall structure as shown in FIG. 1(A) and FIG. 1(B) may be applied to a partition wall with a wooden framework structure wherein solid wooden members, each having rectangular or square cross-sections are used as the end post elements 11-14 as shown in FIGS. 16 to 18.

Although the present invention has been described as to preferred embodiments or examples, the present invention is not limited thereto, but may be carried out in any of various changes or variations without departing from the scope of the invention as defined in the accompanying claims.

For instance, although the reinforced gypsum boards and the gypsum board-hard type are used as the interior finishing boards of the partition wall in the aforementioned embodiments, the panels of the partition wall may be the other gypsum board products, such as structural gypsum boards, gypsum sheathing boards, or decorated gypsum boards; gypsum boards with glass fiber nonwoven fabric ("Tiger Glass Rock" (registered trademark) manufactured by Yoshino Gypsum Co., Ltd.); slag gypsum boards ("Asnon" (registered trademark) and so forth); cement boards ("Duracrete" (registered trademark) and so forth); fiber reinforced gypsum boards ("FG board" (trademark) and so forth); extruded cement panels ("Clion Stud-less Panel", "SLP Panel" (trademarks)); ALC panels; calcium silicate boards; wooden plywood panels; ceramic sidings, and so forth may be used as the interior finishing panels for constructing the partition wall.

Further, the embodiment as set forth above relates to the partition wall constructed in a building with a reinforced concrete structure, but the present invention is applicable to the partition wall to be constructed in a building having a steel structure, steel-reinforced concrete structure, or wooden structure.

In addition, the embodiment as set forth above relates to the partition wall having the sound-insulation performance corresponding to the $TL_D$ value equal to or greater than 50, but the present invention is applicable to the partition wall having the sound-insulation performance corresponding to the $TL_D$ value smaller than 50, e.g., the partition wall having the sound-insulation performance corresponding to the $TL_D$ value equal to 40. The present invention may be applied even to the partition wall having the $TL_D$ value equal to 20 or 30.

Further, in the embodiments as shown in FIGS. 1 to 6, the solid vibration propagation is interrupted or insulated by the air space of the gap between the end post elements, but a material with a vibration-insulating property, such as a fibrous material, soft resin, rubber, elastomer, porous foam and so forth, may be charged or inserted in the gap to partially form an isolation zone at the gap, or the elements may be connected to each other by a connection or linkage device capable of vibration insulation action.

INDUSTRIAL APPLICABILITY

The present invention can be applied to a partition wall structure which is provided as a party wall, a boundary wall, a fire-resisting wall, and so forth in a high-rise or middle-rise building and which is constructed in the single-runner staggered-stud pattern or the single-runner staggered-pad pattern. The present invention is also applicable to a method for constructing such a partition wall. The present invention is used for increasing the acoustic transmission loss of the high and middle frequency noises, thereby improving the sound-insulation performance of the partition wall. According to the present invention, a high-performance sound-insulation wall, which exhibits the sound-insulation performance corresponding to the $TL_D$ value exceeding 50, can be further improved by a relatively simple structure, and therefore, practical advantages of the present invention are remarkable.

LIST OF REFERENCE SIGNS 1 partition wall
1a wall end portion
2 lower runner
3 upper runner
4 steel stud
5 substrate layer board
6 surface layer board
8 interior finishing material
9, 19 metal spacer
10 end post
11, 13, 15 first end post element
12, 14, 16 second end post element
20 filler for joints along four peripheral edges
30 screw
40, 41 thermal-insulating and sound-absorbing material
42 isolation zone
51, 52 buffer material
α inside space
β, γ gap
L2, T3 dimension of gap
L5, L6 dimension of protrusion
R1, R2 architectural space
Si noise
So solid propagation sound
X wall centerline
B beam
Ba lower surface
C column
Ca vertical surface
W wall
Wa wall surface
F1, F2 floor structure

The invention claimed is:

1. A partition wall to be constructed in a single-runner staggered-stud pattern or a single-runner staggered-pad pattern, comprising:
a wall end portion which is butted against a different wall or a column in continuity therewith and which is exposed to architectural spaces at least partially; and
an end post located at said wall end portion and constituted from first and second end post elements, and a gap spacing said end post elements to be separated from each other and configured to interrupt a propagation of a solid vibration or to insulate a path to propagate the solid vibration;
wherein an interior finishing panel to define one of the architectural space on one side of the partition wall is fixed to said first end post element and another interior finishing panel to define the other of the architectural space on an opposite side of the partition wall is fixed to said second end post element,
wherein said first and second end post elements are positioned at said wall end portion in a positional relationship such that the end post elements are shifted relative to each other in a wall core direction and the gap extends between the end post elements in a wall thickness direction;
wherein said wall end portion is butted against a vertical surface of said different wall or said column in a form of a butt joint, and said first end post element is positioned in close proximity to or in contact with a surface of an interior finishing material of said different wall or said column, or a substrate face of said different wall or said column without installation of the interior finishing material, and said second end post element is positioned in an inside space of the partition wall,
wherein said partition wall is a lightweight partition wall with a hollow structure, which possesses a sound-insulation performance corresponding to a $TL_D$ value equal to or greater than 50,
wherein a runner constituting the partition wall is a steel runner, and each of said first and second end post elements is a steel stud having substantially the same width as that of a steel stud constituting each of intermediate posts of the partition wall,
wherein each of the intermediate posts is erected in a staggered formation with use of a runner spacer for the steel stud, and the first and second end post elements are erected at said wall end portion,
wherein each of said panels on both sides of the partition wall is constituted from a substrate layer board and a surface layer board securely adhered to each other, the substrate layer board is a gypsum board with a thickness ranging from 20 mm to 25 mm, and the surface layer board is a gypsum board with a thickness ranging from 8 mm to 13 mm,
wherein protrusions of the substrate layer board and the surface layer board of at least one of the interior finishing panels extend in the wall core direction toward a terminal end of the partition wall from said second end post element, dimensions of the protrusions are set to be equal to or smaller than 80 mm, and a dimension of said gap is set to be in a range from 10 mm to 40 mm, and
wherein an air-tight joint structure is formed by a sealing material or sealing materials interposed between each of terminal end edges of said substrate layer and surface layer boards constituting each of said panels and said surface of the interior finishing material or said substrate face.

2. The partition wall as defined in claim 1,
wherein a buffer material is integrally attached to an outside surface of said first end post element, and an outside surface of the buffer material is in contact with an inside face of the substrate layer board or slightly spaced apart therefrom.

3. A method for constructing a partition wall in a single-runner staggered-stud pattern or a single-runner staggered-pad pattern, wherein a wall end portion of the partition wall is butted against a different wall or a column in continuity therewith so as to be exposed to architectural spaces at least partially, comprising:
constituting an end post to be located at an end portion of the partition wall, from first and second end post elements;
spacing said end post elements to be separated from each other to form a gap therebetween for interrupting a propagation of a solid vibration or insulating a path for propagating the solid vibration;
fixing to said first end post element, an interior finishing panel for defining one of the architectural spaces on one side of the partition wall, and
fixing to said second end post element, an interior finishing panel for defining the other of the architectural spaces on an opposite side of the partition wall,
wherein said first and second end post elements are positioned at said wall end portion in a positional relationship such that the end post elements are shifted relative to each other in a wall core direction and the gap between the end post elements extends in a wall thickness direction, said wall end portion is butted against a vertical surface of said different wall or said column in a form of a butt joint, said first end post element is positioned in close proximity to or in contact with a surface of an interior finishing material of said different wall or said column, or a substrate face of said different wall or said column without installation of the interior finishing material, and said second end post element is positioned in an inside space of the partition wall,
wherein said partition wall is a lightweight partition wall with a hollow structure, which possesses a sound-insulation performance corresponding to a $TL_D$ value equal to or greater than 50,
wherein a runner constituting the partition wall is a steel runner, and said first and second end post elements are steel studs, each having substantially the same width as that of a steel stud constituting each of intermediate posts of the partition wall,
wherein the intermediate posts are erected in a staggered formation with use of runner spacers for the steel studs, and the first and second end post elements are erected at said wall end portion,
wherein each of said panels on both sides of the partition wall is constituted from a substrate layer board and a surface layer board, the substrate layer board is a gypsum board with a thickness ranging from 20 to 25 mm, the surface layer board is a gypsum board with a thickness ranging from 8 to 13 mm, the substrate layer board is securely fixed to each of said first and second end post elements, and the surface layer board is adhered onto the substrate layer board,
wherein protrusions of the substrate layer board and the surface layer board of at least one of the interior finishing panels extend in the wall core direction toward a terminal end of the partition wall from said second end post element, dimensions of the protrusions are set to be equal to or smaller than 80 mm, and a dimension of said gap is set to be in a range from 10 mm to 40 mm, and
wherein an air-tight joint structure is formed by a sealing material or sealing materials interposed between each of terminal end edges of said substrate layer and surface layer boards constituting each of said panels and said surface of the interior finishing material or said substrate face.

4. The method as defined in claim 3, wherein a buffer material is integrally attached to an outside surface of said first end post element, and an outside surface of the buffer material is in contact with an inside face of said substrate layer board or slightly spaced apart therefrom.

5. A method of sound-insulation of a partition wall for improving a sound-insulation performance of the partition wall to be constructed in a single-runner staggered-stud pattern or a single-runner staggered-pad pattern, wherein the partition wall has a wall end portion butted against a different wall or a column in continuity therewith in a condition that the wall end portion is exposed to architectural spaces at least partially, and wherein the method is applied to the partition wall possessing a sound-insulation performance corresponding to a $TL_D$ value equal to or smaller than 57, for improving the $TL_D$ value up to a value ranging from 58 to 65 comprising:
dividing an end post to be located at an end portion of the partition wall, into first and second end post elements,
spacing said end post elements to be separated from each other to form a gap for interrupting a propagation of a solid vibration or insulating a path for propagating the solid vibration,
fixing to said first end post element, an interior finishing panel for defining one of the architectural spaces on one side of the partition wall, and
fixing to said second end post element, an interior finishing panel for defining the other of the architectural spaces on an opposite side of the partition wall,
wherein said first and second end post elements are positioned at said wall end portion in a positional relationship such that the end post elements are shifted relative to each other in a wall core direction and the gap between the first and second end post elements extends in a wall thickness direction, said wall end portion is butted against a vertical surface of said different wall or said column in a form of a butt joint, said first end post element is positioned in close proximity to or in contact with a surface of an interior finishing material of said different wall or said column, or a substrate face of said different wall or said column without installation of the interior finishing material, and said second end post element is positioned in an inside space of the partition wall,
wherein said partition wall is a lightweight partition wall with a hollow structure,
wherein a runner constituting the partition wall is a steel runner, and said first and second end post elements are steel studs, each having substantially the same width as that of a steel stud constituting each of intermediate posts of the partition wall,
wherein the intermediate posts are erected in a staggered formation with use of runner spacers for the steel studs, and the first and second end post elements are erected at said wall end portion, wherein each of said panels on both sides of the partition wall is constituted from a substrate layer board and a surface layer board, the substrate layer board is a gypsum board with a thickness ranging from 20 to 25 mm, the surface layer board is a gypsum board with a thickness ranging from 8 to 13 mm, the substrate layer board is securely fixed to each of said first and second end post elements, and the surface layer board is adhered onto the substrate layer board, wherein protrusions of the substrate layer board and the surface layer board of at least one of the interior finishing panels extend in the wall core direction toward a terminal end of the partition wall from said second end post element, dimensions of the protrusions are set to be equal to or smaller than 80 mm, and a dimension of said gap is set to be in a range from 10 mm to 40 mm, and wherein an air-tight joint structure is formed by a sealing material or sealing materials interposed between each of terminal end edges of said substrate layer and surface layer boards constituting each of said panels and said surface of the interior finishing material or said substrate face.

\* \* \* \* \*